(12) United States Patent
Hannuksela et al.

(10) Patent No.: US 11,172,005 B2
(45) Date of Patent: Nov. 9, 2021

(54) METHOD AND APPARATUS FOR CONTROLLED OBSERVATION POINT AND ORIENTATION SELECTION AUDIOVISUAL CONTENT

(71) Applicant: Nokia Technologies Oy, Espoo (FI)

(72) Inventors: Miska Matias Hannuksela, Tampere (FI); Payman Aflaki-Beni, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 436 days.

(21) Appl. No.: 15/261,192

(22) Filed: Sep. 9, 2016

(65) Prior Publication Data

US 2018/0077210 A1 Mar. 15, 2018

(51) Int. Cl.
*H04L 29/06* (2006.01)
*H04N 21/845* (2011.01)
(Continued)

(52) U.S. Cl.
CPC .......... *H04L 65/60* (2013.01); *H04L 65/4076* (2013.01); *H04L 65/4084* (2013.01);
(Continued)

(58) Field of Classification Search
CPC ... H04L 65/60; H04L 65/607; H04L 65/4084; H04L 65/605; H04L 65/4076; H09N 21/47217
See application file for complete search history.

(56) References Cited

U.S. PATENT DOCUMENTS 6,256,046 B1 * 7/2001 Waters .................... G06T 7/285
345/473
8,219,438 B1 * 7/2012 Moon ................ G06Q 30/0201
705/7.29
(Continued)

FOREIGN PATENT DOCUMENTS

CN 1711568 A 12/2005
CN 103609105 A 2/2014
(Continued)

OTHER PUBLICATIONS

J. Grubert, T. Langlotz, S. Zollmann and H. Regenbrecht, "Towards Pervasive Augmented Reality: Context-Awareness in Augmented Reality," in IEEE Transactions on Visualization and Computer Graphics, vol. 23, No. 6, pp. 1706-1724, Jun. 1, 2017, doi : 10.1109/TVCG.2016.2543720. (Year: 2016).*
(Continued)

*Primary Examiner* — Uzma Alam
(74) *Attorney, Agent, or Firm* — Alston & Bird LLP

(57) ABSTRACT

A method, apparatus and computer program product are provided to provide the rendering of audiovisual content, such as 360-degree virtual reality content, in a manner that allows for control over whether, and to what degree, the content presented to a viewer should take into account the relative positioning of the content with respect to the viewer. In particular, implementations are presented that allow for situational control over the rendering of content based on an initial observation setup associated with a segment or subsegment of content, the orientation of the viewing device, and/or the manner in which the segment or subsegment is accessed by a playback device.

19 Claims, 12 Drawing Sheets

(51) Int. Cl.
*H04N 21/2343* (2011.01)
*H04N 21/472* (2011.01)

(52) U.S. Cl.
CPC .......... *H04L 65/605* (2013.01); *H04L 65/607* (2013.01); *H04N 21/23439* (2013.01); *H04N 21/47217* (2013.01); *H04N 21/8456* (2013.01)

(56) References Cited

U.S. PATENT DOCUMENTS

| | | | |
|---|---|---|---|
| 8,386,560 | B2 | 2/2013 | Ma et al. |
| 9,130,685 | B1 * | 9/2015 | Blesser ................. G10L 19/018 |
| 9,277,283 | B2 * | 3/2016 | Cho ........................ G06T 11/00 |
| 9,418,059 | B1 * | 8/2016 | Singliar ............. G06F 16/3344 |
| 2006/0074769 | A1 * | 4/2006 | Looney ............. G06Q 30/0251 705/14.66 |
| 2007/0189725 | A1 | 8/2007 | Johnson et al. |
| 2009/0254971 | A1 * | 10/2009 | Herz .................. G06Q 30/0603 726/1 |
| 2011/0119394 | A1 | 5/2011 | Wang et al. |
| 2013/0282715 | A1 * | 10/2013 | Xu ........................ G06F 16/783 707/736 |
| 2014/0118509 | A1 * | 5/2014 | Kroon .................. H04N 13/376 348/51 |
| 2014/0132630 | A1 * | 5/2014 | Mun ..................... H04N 21/816 345/633 |
| 2015/0234456 | A1 * | 8/2015 | Cho ......................... G06F 3/013 345/156 |
| 2015/0324829 | A1 * | 11/2015 | Himelfarb .......... G06Q 30/0226 705/14.27 |
| 2015/0346812 | A1 | 12/2015 | Cole et al. |
| 2015/0350413 | A1 * | 12/2015 | Ma .................... H04M 1/72577 455/418 |
| 2015/0365645 | A1 * | 12/2015 | Bruls ................... H04N 13/178 348/43 |
| 2016/0034251 | A1 * | 2/2016 | Sendai ..................... G06F 3/167 345/156 |
| 2016/0150212 | A1 | 5/2016 | Moura et al. |
| 2016/0191893 | A1 * | 6/2016 | Gewickey ............ H04N 13/388 386/223 |
| 2016/0219325 | A1 | 7/2016 | Chu et al. |
| 2016/0260251 | A1 | 9/2016 | Stafford et al. |
| 2016/0301373 | A1 * | 10/2016 | Herman ............... H03G 3/3005 |
| 2017/0083084 | A1 * | 3/2017 | Tatsuta .................. G06F 3/0346 |
| 2017/0142486 | A1 | 5/2017 | Masuda |
| 2017/0347084 | A1 * | 11/2017 | Boyce ..................... G06F 3/013 |

FOREIGN PATENT DOCUMENTS

| | | | | |
|---|---|---|---|---|
| CN | 103812761 A | 5/2014 | | |
| CN | 104982033 A | 10/2015 | | |
| EP | 2648393 A1 * | 10/2013 | .......... | G06F 11/1415 |
| EP | 3 171 602 A1 | 5/2017 | | |
| JP | 2016 105593 A | 6/2016 | | |
| RU | 238 4005 C3 | 3/2010 | | |
| RU | 2012 122792 A | 12/2013 | | |
| WO | WO 2016/002318 A1 | 1/2016 | | |
| WO | WO 2016/009864 A1 | 1/2016 | | |
| WO | WO 2017/140945 A1 | 8/2017 | | |
| WO | WO 2017/203098 A1 | 11/2017 | | |

OTHER PUBLICATIONS

International Search Report and Written Opinion from International Application No. PCT/FI2017/050626 dated Jan. 9, 2018, 16 pages.
Zoric, G. et al.; "Panoramic Video: Design Challenges and Implications for Content Interaction"; Proceedings of the 11th European Conference on Interactive TV and Video (EuroITV'13) [online], Jun. 24, 2013, pp. 153-162 [retrieved on Jan. 8, 2018]. Retrieved from <https://dl.acm.org/citation.cfm?id=2465959> <DOI:10.1145/2465958.2465959> abstract; sections 4-5.
Kuzyakov et al. "Next-generation video encoding techniques for 360 video and VR." [online] [retrieved Nov. 1, 2016] Retrieved from the Internet, URL: <https://code.facebook.com/posts/1126354007399553/next-generation-video-encoding-techniquest-for-360-video-and-vr>, 7 pages.
Hannuksela et al. "DASH / OMAF: Virtual Reality Video Descriptor." ISO/IEC JTC1/SC29/WG11 Coding of Moving Pictures and Audio, May/Jun. 2016, Geneva, 5 pages.
U.S. Appl. No. 62/340,707, filed May 24, 2016, 114 pages.
Office Action for Russian Application No. 2019108362/08(016098) dated Jan. 15, 2020, 16 pages.
Office Action for Japanese Application No. 2019-513366 dated Feb. 6, 2020, 9 pages.
Extended European Search Report for Application No. EP 17 84 8210 dated Mar. 23, 2020, 11 pages.
Champel, M. "SRD Extensions for VR", Technicolor, ISO/IEC JTC1/SC29/WG11 MPEG 211 4/m38689, dated (May 2016) 5 pages.
Office Action for Japanese Application No. 2019-513366 dated Apr. 16, 2020, 6 pages.
Office Action for Korean Application No. 2019-7010000 dated Apr. 3, 2020, 5 pages.
Office Action for European Application No. 17848210.5 dated Mar. 1, 2021, 6 pages.
Office Action for Korean Application No. 2019-7010000 dated Oct. 27, 2020.
Office Action from Chinese Patent Application No. 201780055655.0 dated Oct. 12, 2020, with English translation, 10 pages.
First Examination Report for India Application No. 201947005650 dated Jul. 16, 2021, 6 pages.
Office Action for Chinese Application No. 2017800556550 dated Jun. 10, 2021, 14 pages.
Office Action for Indonesian Application No. PID201902144 dated Aug. 18, 2021, 5 pages.

* cited by examiner

METHOD AND APPARATUS FOR CONTROLLED OBSERVATION POINT AND ORIENTATION SELECTION AUDIOVISUAL CONTENT

TECHNICAL FIELD

An example embodiment relates generally to encoding media content, particularly in the context of streaming virtual reality and other audiovisual content.

BACKGROUND

Virtual reality audiovisual content, such as 360° video and other similar content, has become increasingly popular amongst viewers and content creators who prefer or otherwise enjoy the immersive viewing experience available from such content. This increase in the popularity of virtual reality content has driven viewer demand for streaming virtual reality content that provides a high-quality viewing experience.

The need to provide a consistent, high-quality viewing experience in a streaming virtual reality content environment imposes several technical challenges, particularly when a content creator has made creative and/or other directorial decisions regarding how content should be presented to a viewer and how such content should be presented within the viewer's field of view. These technical challenges can be compounded in contexts where a viewer is subject to a finite range of comfortable viewing orientations or where a viewer's orientation tends cause the viewer to experience the content in a manner that diverges from the content creator's intentions.

BRIEF SUMMARY

A method, apparatus and computer program product are therefore provided in accordance with an example embodiment in order to provide for user-driven selective rendering of audiovisual content. In this regard, the method, apparatus and computer program product of an example embodiment provide for control over an observation point and orientation selection of audiovisual content to be rendered.

In an example embodiment, a method is provided that includes receiving an indication associated with an initial observation setup of a set of transmission units of an audiovisual presentation. The method of this example embodiment also includes receiving an indication associated with an intended behavior of a playback device. The method of this example embodiment also includes determining the intended behavior of the playback device. The method of this example embodiment also includes, in response to determining the intended behavior of the playback device, causing a control signal to be generated, wherein the control signal is associated with a rendering operation of the audiovisual presentation on the playback device.

In some example implementations of such a method, the observation setup comprises an observation point and an observation orientation. In some such example implementations, and in other example implementations, the indication associated with the intended behavior of the playback device comprises an indication associated with an intended behavior of the playback device under a continuous playback mode of the playback device and an indication associated with an intended behavior of the playback device under a random access mode of the playback device.

In some example implementations, determining the intended behavior of the playback device comprises determining whether a condition associated with the intended behavior of the playback device has been met. In some such example implementations, and in other example implementations, the condition comprises at least one reset condition associated with the initial observation setup. In some such example implementations, and in other example implementations, the condition comprises at least one sustaining condition associated with the initial observation set up.

In some example implementations, the rendering operation of the audiovisual presentation on the playback device comprises selecting a portion of the audiovisual presentation.

In another example embodiment, an apparatus is provided that includes at least one processor and at least one memory that includes computer program code with the at least one memory and the computer program code configured to, with the at least one processor, cause the apparatus to at least receive an indication associated with an initial observation setup of a set of transmission units of an audiovisual presentation; receive an indication associated with an intended behavior of a playback device; determine the intended behavior of the playback device; and in response to determining the intended behavior of the playback device, cause a control signal to be generated, wherein the control signal is associated with a rendering operation of the audiovisual presentation on the playback device.

In some example implementations, the observation setup comprises an observation point and an observation orientation. In some such example implementations, and in other example implementations, the indication associated with the intended behavior of the playback device comprises an indication associated with an intended behavior of the playback device under a continuous playback mode of the playback device and an indication associated with an intended behavior of the playback device under a random access mode of the playback device.

In some example implementations, determining the intended behavior of the playback device comprises determining whether a condition associated with the intended behavior of the playback device has been met. In some such example implementations, and in other example implementations, the condition comprises at least one reset condition associated with the initial observation setup. In some such example implementations, and in other example implementations, the condition comprises at least one sustaining condition associated with the initial observation set up.

In some example implementations, the rendering operation of the audiovisual presentation on the playback device comprises selecting a portion of the audiovisual presentation.

In a further example embodiment, a computer program product is provided that includes at least one non-transitory computer-readable storage medium having computer-executable program code instructions stored therein with the computer-executable program code instructions including program code instructions configured to receive an indication associated with an initial observation setup of a set of transmission units of an audiovisual presentation; receive an indication associated with an intended behavior of a playback device; determine the intended behavior of the playback device; and in response to determining the intended behavior of the playback device, cause a control signal to be generated, wherein the control signal is associated with a rendering operation of the audiovisual presentation on the playback device, wherein the rendering operation of the audiovisual presentation on the playback device comprises selecting a portion of the audiovisual presentation.

In some example implementations, the observation setup comprises an observation point and an observation orientation. In some such example implementations, and in other example implementations, the indication associated with the intended behavior of the playback device comprises an indication associated with an intended behavior of the playback device under a continuous playback mode of the playback device and an indication associated with an intended behavior of the playback device under a random access mode of the playback device.

In some example implementations, determining the intended behavior of the playback device comprises determining whether a condition associated with the intended behavior of the playback device has been met. In some such example implementations, and in other example implementations, the condition comprises at least one reset condition associated with the initial observation setup. In some such example implementations, and in other example implementations, the condition comprises at least one sustaining condition associated with the initial observation set up.

In yet another example embodiment, an apparatus is provided that includes means for receiving an indication associated with an initial observation setup of a set of transmission units of an audiovisual presentation; receiving an indication associated with an intended behavior of a playback device; determining the intended behavior of the playback device; and in response to determining the intended behavior of the playback device, causing a control signal to be generated, wherein the control signal is associated with a rendering operation of the audiovisual presentation on the playback device.

In some example implementations, the observation setup comprises an observation point and an observation orientation. In some such example implementations, and in other example implementations, the indication associated with the intended behavior of the playback device comprises an indication associated with an intended behavior of the playback device under a continuous playback mode of the playback device and an indication associated with an intended behavior of the playback device under a random access mode of the playback device.

In some example implementations, determining the intended behavior of the playback device comprises determining whether a condition associated with the intended behavior of the playback device has been met. In some such example implementations, and in other example implementations, the condition comprises at least one reset condition associated with the initial observation setup. In some such example implementations, and in other example implementations, the condition comprises at least one sustaining condition associated with the initial observation set up.

In some example implementations, the rendering operation of the audiovisual presentation on the playback device comprises selecting a portion of the audiovisual presentation.

In a further example embodiment, a method is provided that includes detecting an observation setup associated with a set of transmission units of an audiovisual presentation; determining whether a condition associated with the observation setup is met; in response to determining whether a condition associated with the observation setup is met, selecting a subset of the transmission units of an audiovisual presentation; and causing a control signal to be generated, wherein the control signal is associated with a rendering operation of the selected subset of the transmission units of the audiovisual presentation on the playback device.

In some example implementations of such a method, the observation setup comprises one or both of an observation point and an observation orientation. In some such example implementations, and in other example implementations, the observation setup comprises an indication of a most probable viewing direction associated with the set of transmission units of the audiovisual presentation.

In some example implementations, the control signal comprises an indication of an intended behavior of a playback device. In some such example implementations, and in other example implementations, determining whether a condition associated with the observation setup is met comprises determining an orientation associated with the playback device. In some such example implementations, and in other example implementations, determining whether a condition associated with the observation setup is met comprises determining whether the playback device is in a continuous playback mode. In some such example implementations, and in other example implementations, determining whether a condition associated with the observation setup is met comprises determining whether the playback device is in a random access mode.

In yet another example embodiment, an apparatus is provided that includes means for detecting an observation setup associated with a set of transmission units of an audiovisual presentation; determining whether a condition associated with the observation setup is met; in response to determining whether a condition associated with the observation setup is met, selecting a subset of the transmission units of an audiovisual presentation; and causing a control signal to be generated, wherein the control signal is associated with a rendering operation of the selected subset of the transmission units of the audiovisual presentation on the playback device.

In some example implementations of such an apparatus, the observation setup comprises one or both of an observation point and an observation orientation. In some such example implementations, and in other example implementations, the observation setup comprises an indication of a most probable viewing direction associated with the set of transmission units of the audiovisual presentation.

In some example implementations, the control signal comprises an indication of an intended behavior of a playback device. In some such example implementations, and in other example implementations, determining whether a condition associated with the observation setup is met comprises determining an orientation associated with the playback device. In some such example implementations, and in other example implementations, determining whether a condition associated with the observation setup is met comprises determining whether the playback device is in a continuous playback mode. In some such example implementations, and in other example implementations, determining whether a condition associated with the observation setup is met comprises determining whether the playback device is in a random access mode.

BRIEF DESCRIPTION OF THE DRAWINGS

Figure 1:
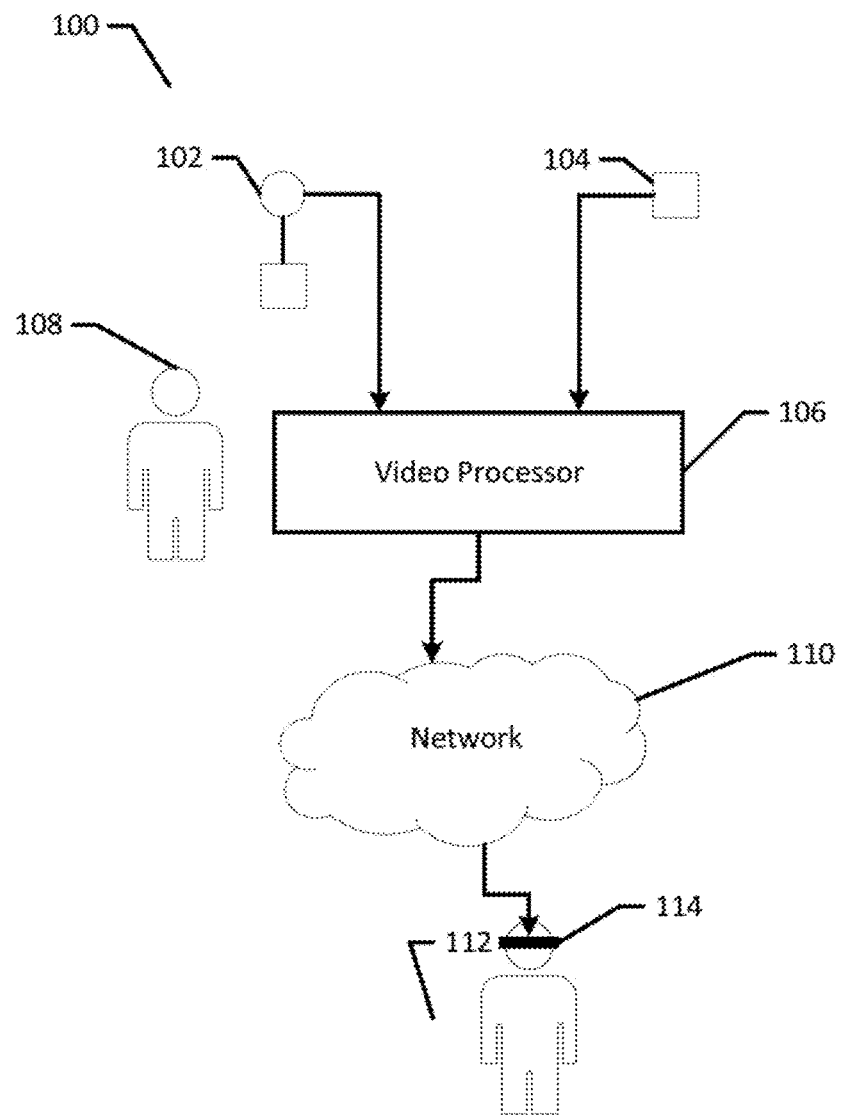
Figure 2:
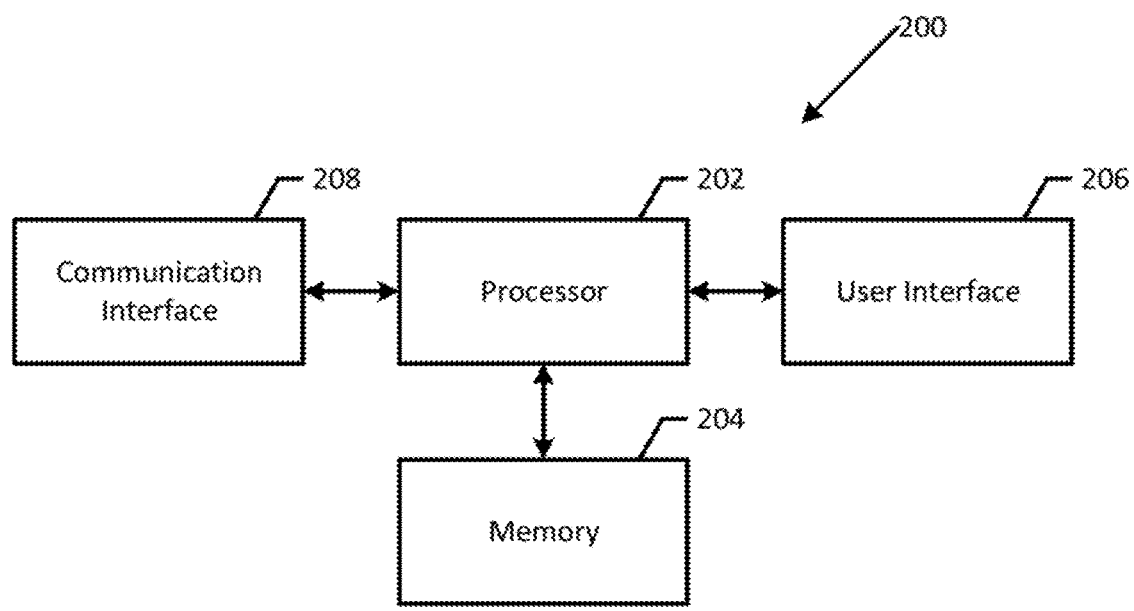
Figure 3:
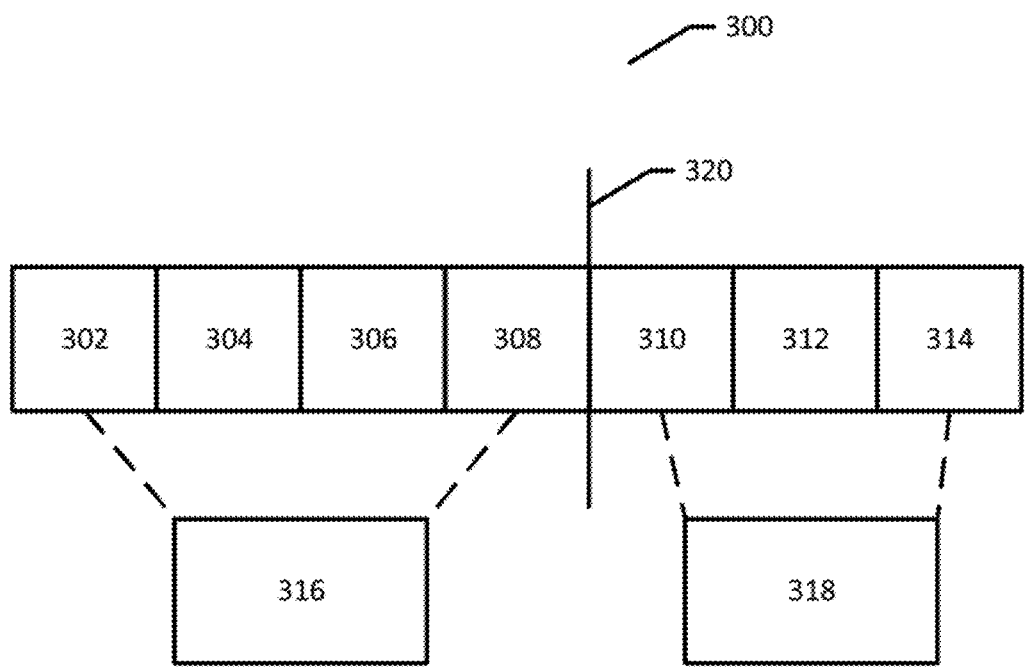
Figure 4:
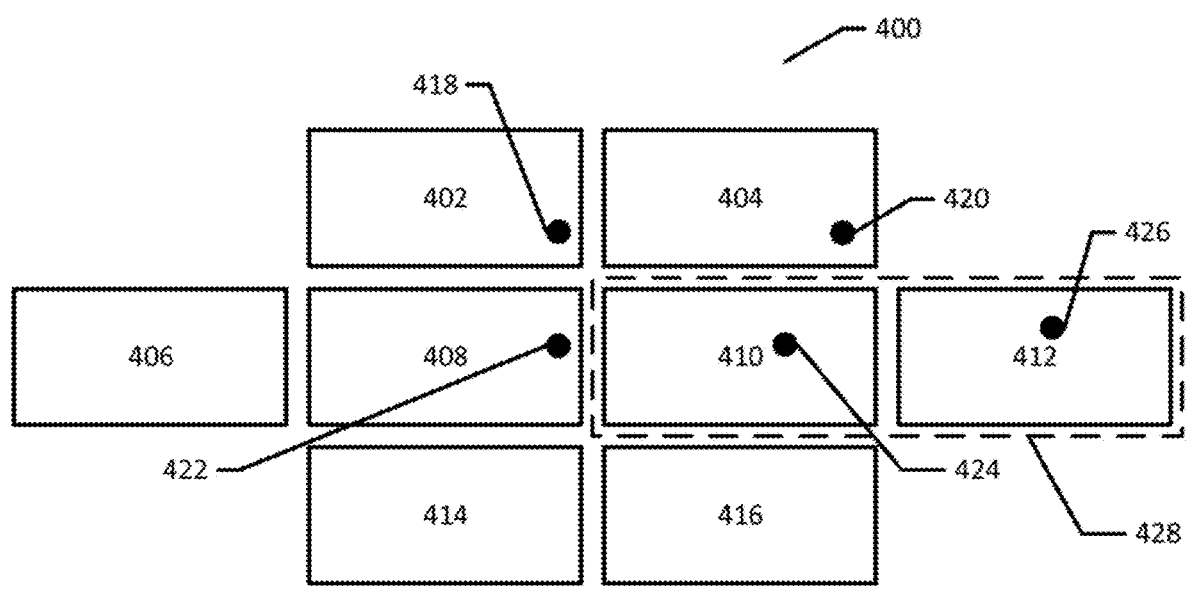
Figure 5:
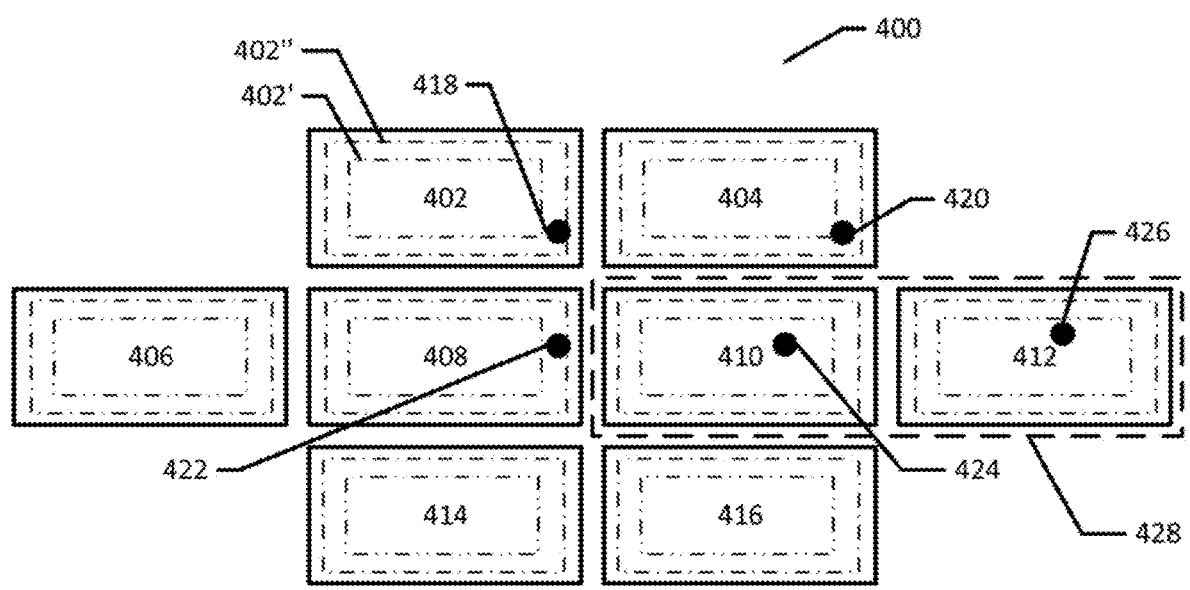
Figure 6A:
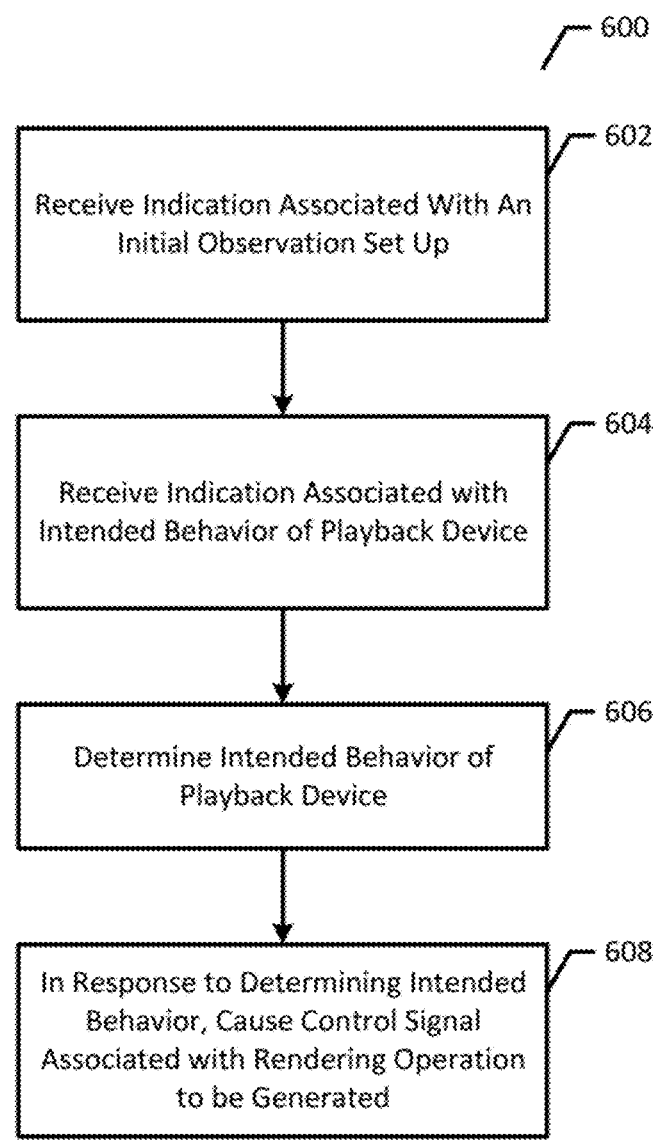
Figure 6B:
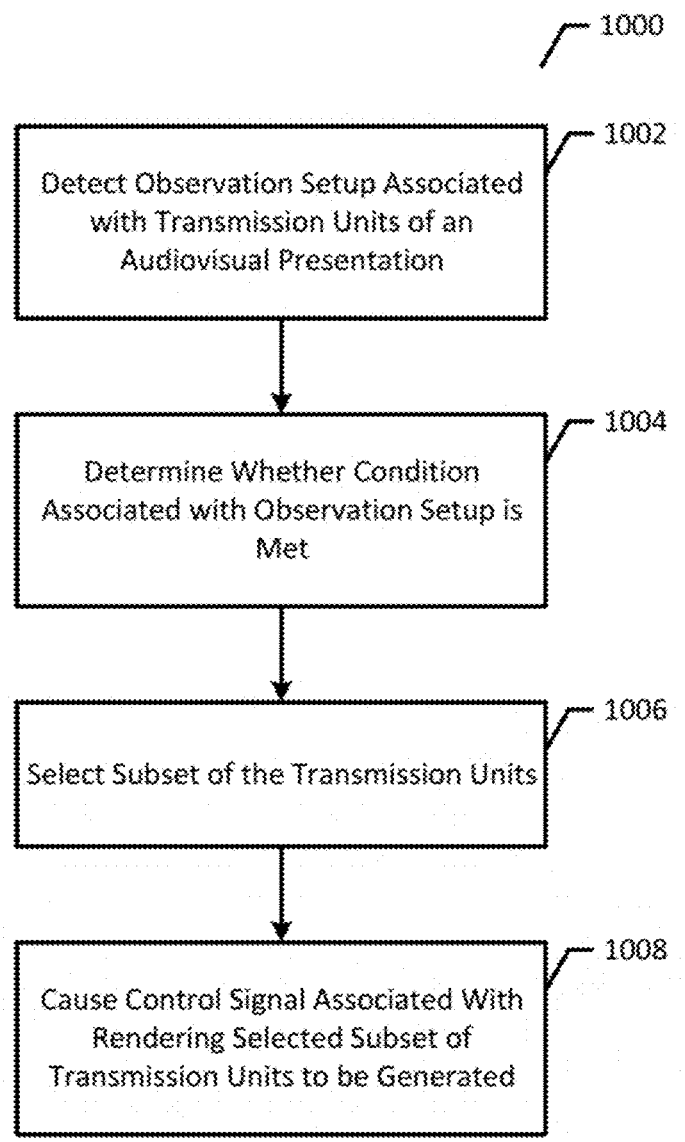
Figure 7:
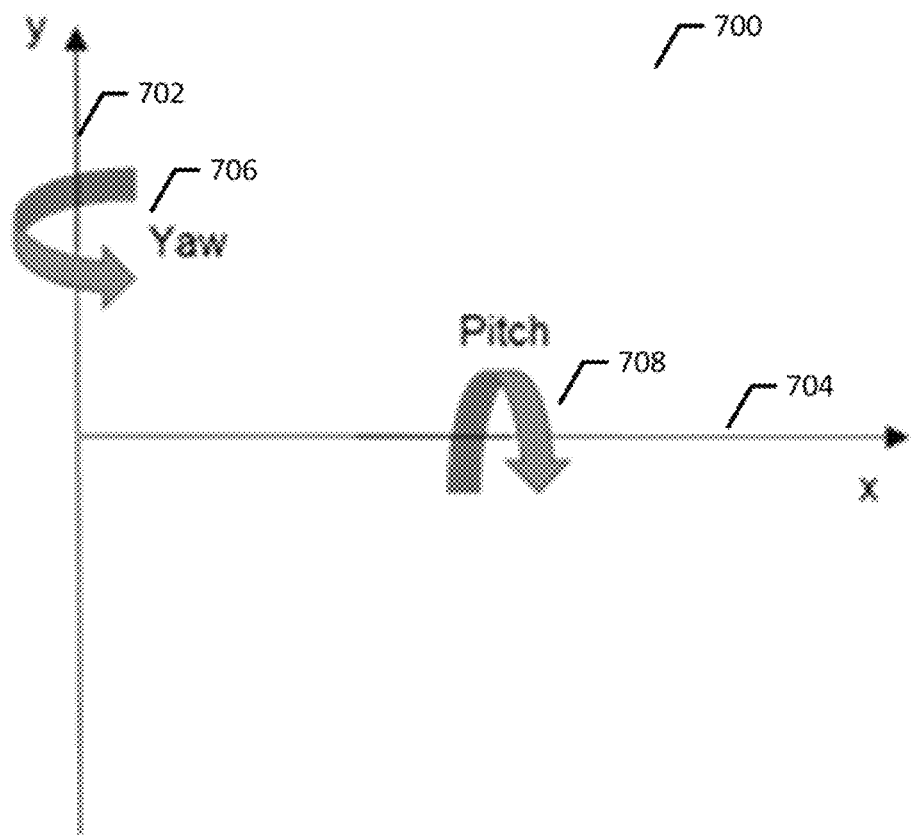
Figure 8:
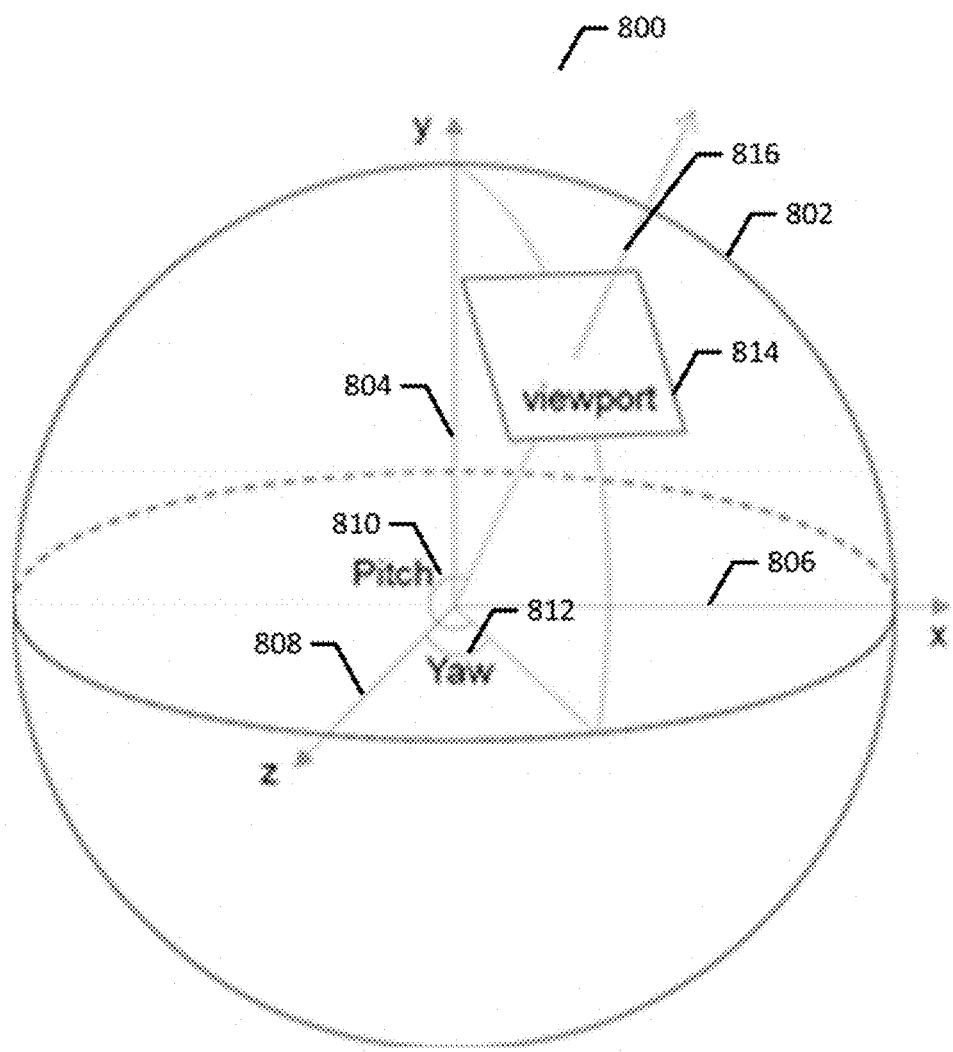
Figure 9:
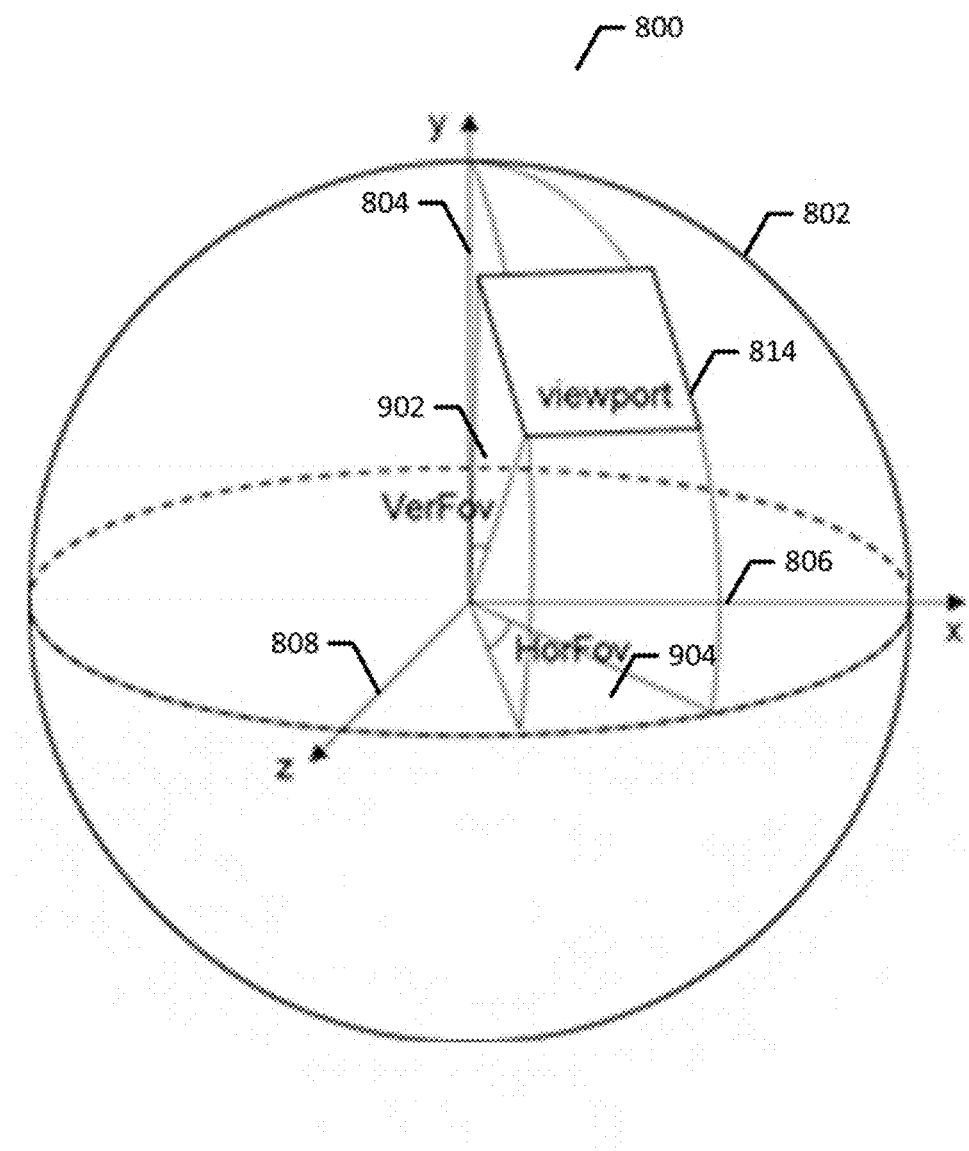

Having thus described certain example embodiments of the present disclosure in general terms, reference will hereinafter be made to the accompanying drawings, which are not necessarily drawn to scale, and wherein:

FIG. 1 depicts an example system environment in which implementations in accordance with an example embodiment of the present invention may be performed;

FIG. 2 is a block diagram of an apparatus that may be specifically configured in accordance with an example embodiment of the present invention;

FIG. 3 is a block diagram illustrating an example implementation performed in the context of a virtual reality video presentation in accordance with an example embodiment of the present invention;

FIG. 4 is a block diagram illustrating an example implementation performed in the context of a multi-view video presentation in accordance with an example embodiment of the present invention;

FIG. 5 is a block diagram illustrating another example implementation performed in the context of a multi-view video presentation in accordance with an example embodiment of the present invention;

FIG. 6A is a flowchart illustrating a set of operations performed, such as by the apparatus of FIG. 2, in accordance with an example embodiment of the present invention;

FIG. 6B is a flowchart illustrating a set of operations performed, such as by the apparatus of FIG. 2, in accordance with an example embodiment of the present invention;

FIG. 7 is a graphical representation of terms referenced in connection with describing some of the example embodiments contained herein;

FIG. 8 is another graphical representation of terms referenced in connection with describing some of the example embodiments contained herein; and FIG. 9 is another graphical representation of terms referenced in connection with describing some of the example embodiments contained herein.

Figure 10:
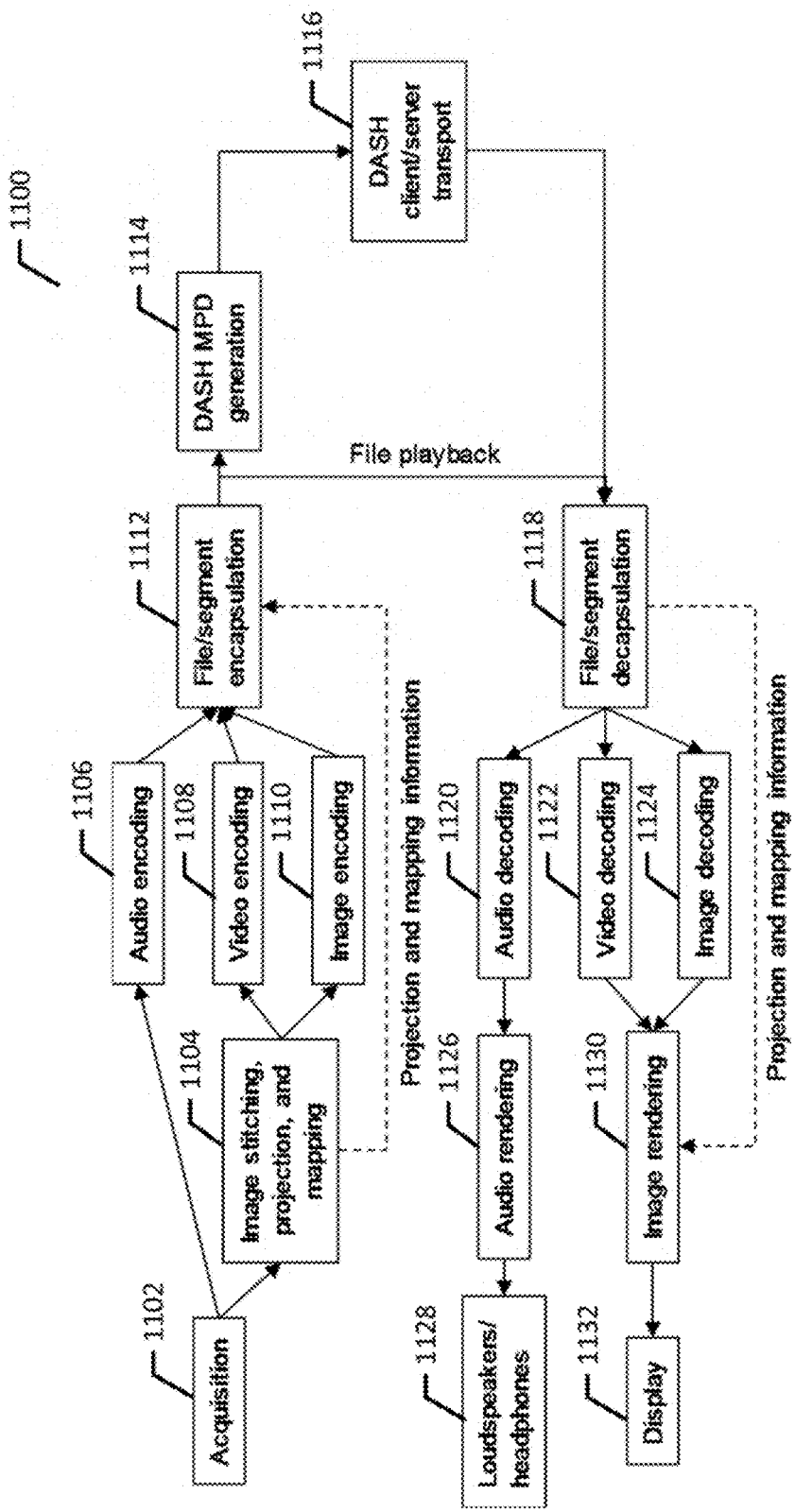
Figure 11:
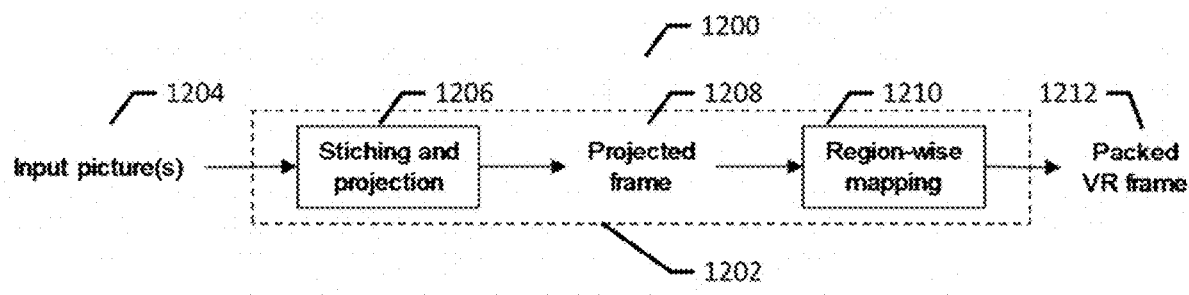

FIG. 10 is a block diagram illustrating an example implementation performed in the context of an end-to-end audio-visual virtual reality application in accordance with an example embodiment of the present invention;

FIG. 11 is a block diagram illustrating an example image stitching, projection, and mapping process performed in the context of processing virtual reality image or video content for image or video encoding in accordance with an example embodiment of the present invention;

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

As used herein, the term "mapping" refers to either a process by which image data on a planar surface according to a projection is mapped to a two-dimensional plane, or to the image frame resulting from the process, depending on the context.

As used herein, the term "observation orientation" refers to an orientation being rendered. In many contexts, this is usually an orientation relative to the orientation of a head-mounted display used for rendering content.

As used herein the term "observation point" refers to a point or volume in a three-dimensional space for virtual reality audio/video acquisition or playback. An observation point is usually the same as the center point of a device or rig used for virtual reality audio/video acquisition as well as the position of the observer's head in the three-dimensional space in which the audio and video tracks are located. In some cases, an observation point might not correspond to a single center point of a capturing device or rig but a trajectory, such as a circle, a region, or a volume, for example. In some cases, an observer's head position is tracked and the rendering is adjusted for head movements in addition to head rotations, and then an observation point may be understood to be an initial or reference position of the observer's head.

As used herein, the term "observation setup" refers to an observation point and observation orientation. In the context of a presentation that has only one observation point available, the observation point need not be explicitly indicated or concluded for an observation setup As used herein, the term "projection" or "VR projection" refers to either a process by which a spherical image is projected onto a geometry, such as a planar surface or a cube, or the image frame resulting from the process. Examples of VR projections include equirectangular panorama and cubemap projections. In some contexts, the term projection may be understood to additionally comprise a mapping of a three-dimensional geometry, such as a cube map, onto one or more two-dimensional planes. Such mapping may comprise packing of a multitude of two-dimensional planes into the same frame (such as one two-dimensional plane, for example).

As used herein, the term "viewport" or "VR viewport" refers to a subset of an omnidirectional field of view. The term "viewport" may refer to a subset of the omnidirectional visual content currently being displayed for a user and/or a subset of the omnidirectional visual content that is coded with distinction (such as quality distinction or as a separable part, or a motion-constrained tile set, for example) from the remaining visual content. A distinction between these two definitions may be provided through a qualifier; such that the former may be referred to as a rendered viewport while the latter may be referred to as a coded viewport. In some cases a viewport may be represented by an orientation and a field of view, while in some other cases a viewport may be represented by an area, such as a rectangle, within a two-dimensional coordinate system for a particular projection format. An example of the latter is a rectangle within an equirectangular panorama image. A viewport may comprise several constituent viewports, which jointly form the viewport and may have different properties, such as picture quality.

As used herein, an "orientation" (such as an orientation of a viewport, for example) may be represented by angular coordinates of a coordinate system. Angular coordinates may, for example, be called yaw, pitch, and roll, indicating the rotation angles around certain coordinate axes, such as y, x and z, respectively. Yaw, pitch, and roll may be used, for example, to indicate an orientation of a viewport. In some contexts, viewport orientation may be constrained; for example, roll may be constrained to be 0. In some such examples, and in other examples, yaw and pitch indicate the Euler angle of the center point of the viewport in degrees. In most contexts, yaw is applied prior to pitch, such that yaw rotates around the Y-axis, and pitch around the X-axis. Likewise, in most contexts, the angles increase clockwise as viewed when looking away from the origin. With reference to FIG. 7, axes 700 include a Y-axis 702 and an X-axis 704. As shown in FIG. 7, yaw 706 is depicted as a rotation around Y-axis 702, and pitch 708 is depicted as a rotation around X-axis 704. With reference to FIG. 8, axes 800 are used to map a three-dimensional space 802 via Y-axis 804, X-axis 806, and Z-axis 808. As shown in FIG. 8, pitch 810 and yaw 812 can be used to indicate the Euler angle of the center point of the viewport 814, which lies along vector 816.

In some example implementations, a field of view (FOV) of a viewport may be represented by a horizontal FOV (HorFov) and a vertical FOV (VerFov). In some contexts HorFov and VerFov may be defined, for example, such that HorFov indicates the horizontal field of view of the viewport in degrees and VerFov indicates the vertical field of view of the viewport in degrees. An example depiction of the use of HorFov and VerFov to represent the FOV of a viewport is presented in FIG. 9. In FIG. 9, the same three dimensional space 802 from FIG. 8 is mapped with axes 800 (including Y-axis 804, X-axis 806, and Z-axis 808). Viewport 814 is likewise placed within space 802. Rather than using pitch and/or yaw to express the Euler angle of the centerpoint of the viewport 814, FIG. 9 depicts an example in which it is possible to represent the field of view of the viewport 814 as HorFov 902 and a VerFov 904.

As used herein, the term "global coordinate system" may refer to a three-dimensional coordinate system as described that has an origin in an observation point.

As used herein, the term "random access" may refer to the ability of a decoder to start decoding a stream at a point other than the beginning of the stream and recover an exact or approximate reconstructed media signal, such as a representation of the decoded pictures. A random access point and a recovery point may be used to characterize a random access operation. A random access point may be defined as a location in a media stream, such as an access unit or a coded picture within a video bitstream, where decoding can be initiated. A recovery point may be defined as a first location in a media stream or within the reconstructed signal characterized in that all media, such as decoded pictures, at or subsequent to a recovery point in output order are correct or approximately correct in content, when the decoding has started from the respective random access point. If the random access point is the same as the recovery point, the random access operation is instantaneous; otherwise, it may be gradual.

Random access points enable, for example, seek, fast forward play, and fast backward play operations in locally stored media streams as well as in media streaming. In contexts involving on-demand streaming, servers can respond to seek requests by transmitting data starting from the random access point that is closest to (and in many cases preceding) the requested destination of the seek operation and/or decoders can start decoding from the random access point that is closest to (and in many cases preceding) the requested destination of the seek operation. Switching between coded streams of different bit-rates is a method that is used commonly in unicast streaming to match the transmitted bitrate to the expected network throughput and to avoid congestion in the network. Switching to another stream is possible at a random access point. Furthermore, random access points enable tuning in to a broadcast or multicast. In addition, a random access point can be coded as a response to a scene cut in the source sequence or as a response to an intra picture update request.

Some example implementations contemplate the use of media file format standards that include, but are not limited to, ISO base media file format (ISO/IEC 14496-12, which may be abbreviated ISOBMFF), MPEG-4 file format (ISO/IEC 14496-14, also known as the MP4 format), file format for NAL (Network Abstraction Layer) unit structured video (ISO/IEC 14496-15) and 3GPP file format (3GPP TS 26.244, also known as the 3GP format). The ISO base media file format is the base for derivation of all the above mentioned file formats (excluding the ISO base media file format itself).

Some concepts, structures, and specifications of ISOBMFF are described below as an example of a container file format, based on which the embodiments may be implemented. However, the aspects of the invention are not limited to ISOBMFF, but rather the description is given for one possible basis on top of which the invention may be partly or fully realized.

One building block in the ISOBMFF is called a box. Each box may have a header and a payload. The box header indicates the type of the box and the size of the box, typically in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISOBMFF may be considered to specify a hierarchical structure of boxes. Each box of the ISO base media file may be identified by a four-character code (4CC, fourCC). A four-character code may interchangeably be represented by a 32-bit unsigned integer (by assuming a certain conversion of characters to 8-bit values, a certain bit endianness, and a certain byte endianness). The header may provide information about the type and size of the box.

According to the ISOBMFF, a file may include media data and metadata that may be enclosed in separate boxes. In an example embodiment, the media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track (trak) box. Each track is associated with a handler, identified by a four-character code, specifying the track type. Video, audio, and image sequence tracks can be collectively called media tracks, and they contain an elementary media stream. Other track types comprise hint tracks and timed metadata tracks. Tracks comprise samples, such as audio or video frames. A media track refers to samples (which may also be referred to as media samples) formatted according to a media compression format (and its encapsulation to the ISOBMFF). A hint track refers to hint samples, containing cookbook instructions for constructing packets for transmission over an indicated communication protocol. The cookbook instructions may include guidance for packet header construction and may include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, one media track may be selected.

The 'trak' box contains a Sample Table box. The Sample Table box may include, for example, all the time and data indexing of the media samples in a track. Typically, the Sample Table box is required to contain a Sample Description box. The Sample Description box typically also includes an entry count field, specifying the number of sample entries included in the box. In most implementations, the Sample Description box is required to contain at least one sample entry. The sample entry format depends on the handler type for the track. Sample entries give detailed information about the coding type used and any initialization information needed for that coding.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above may be realized.

In some examples, the media samples for the movie fragments may reside in an mdat box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISOBMFF specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

A sample grouping in the ISOBMFF and its derivatives, such as the file format for NAL unit structured video (ISO/IEC 14496-15), may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These may be distinguished by a type field used to indicate the type of grouping. The 'sbgp' and the 'sgpd' boxes may be linked using the value of grouping_type and, in some versions of the boxes, also the value of grouping_type_parameter. The 'sbgp' box indicates the index of the sample group description entry that a particular sample belongs to.

The Matroska file format is capable of (but not limited to) storing any of video, audio, picture, or subtitle tracks in one file. Matroska file extensions include .mkv for video (with subtitles and audio), .mk3d for stereoscopic video, .mka for audio-only files, and .mks for subtitles only. Matroska may be used as a basis format for derived file formats, such as WebM.

Matroska uses Extensible Binary Meta Language (EBML) as a basis. EBML specifies a binary and octet (byte) aligned format inspired by the principle of XML. EBML itself is a generalized description of the technique of binary markup. A Matroska file consists of Elements that make up an EBML "document." Elements incorporate an Element 1D, a descriptor for the size of the element, and the binary data itself. Elements can be nested.

A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Hypertext Transfer Protocol (HTTP) has been widely used for the delivery of real-time multimedia content over the Internet, such as in video streaming applications. Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats"). MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MPD provides the necessary information for clients to establish a dynamic adaptive streaming over HTTP. The MPD contains information describing media presentation, such as an HTTP-uniform resource locator (URL) of each Segment to make a GET Segment request. To play the content, the DASH client may obtain the MPD by using HTTP, email, thumb drive, broadcast, or other transport methods, for example. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using HTTP GET requests, for example. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure a media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof typically differing by the encoding choice, such as by bitrate, resolution, language, codec, or the like, for example. The Segment contains a certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, such as ImportantElement, for example. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute, for example. To point to a specific attribute @attribute contained in an element Element, one may write Element@attribute. If an attribute's name consists of two or more combined words, camel-casing may be used after the first word, such as @veryImportantAttribute, for example. Attributes may have assigned a status in the XML as mandatory (M), optional (O), optional with default value (OD) and conditionally mandatory (CM).

In DASH, all descriptor elements are typically structured in the same way, in that they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient. Two elements of type DescriptorType are equivalent, if the element name, the value of the @schemeIdUri and the value of the @value attribute are equivalent. If the @schemeIdUri is a URN, then equivalence may refer to lexical equivalence as defined in clause 5 of RFC 2141. If the @schemeIdUri is a URL, then equivalence may refer to equality on a character-for-character basis as defined in clause 6.2.1 of RFC3986. If the @value attribute is not present, equivalence may be determined by the equivalence for @schemeIdUri only. Attributes and element in extension namespaces might not be used for determining equivalence. The @id attribute may be ignored for equivalence determination.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

MPEG-DASH specifies a Viewpoint element that is formatted as a property descriptor. The @schemeIdUri attribute of the Viewpoint element is used to identify the viewpoint scheme employed. Adaptation Sets containing non-equivalent Viewpoint element values contain different media content components. The Viewpoint elements may equally be applied to media content types that are not video. Adaptation Sets with equivalent Viewpoint element values are intended to be presented together. This handling should be applied equally for recognized and unrecognized @schemeIdUri values.

SRD (Spatial Relationship Description) is specified in the normative Annex H of MPEG-DASH. The following contains some excerpts of the SRD specification.

The SRD scheme allows Media Presentation Description authors to express spatial relationships between Spatial Objects. A Spatial Object is represented by either an Adaptation Set or a Sub-Representation. As an example, a spatial relationship may express that a video represents a spatial part of another full-frame video (e.g. a region of interest, or a tile).

The SupplementalProperty and/or EssentialProperty descriptors with @schemeIdUri equal to "urn:mpeg:dash:srd:2014" are used to provide spatial relationship information associated to the containing Spatial Object. SRD shall be contained exclusively in these two MPD elements (AdaptationSet and SubRepresentation).

Sub-Representation level SRDs may be used to represent Spatial Objects in one Representation such as HEVC tiling streams. In that case, SRD descriptors may be present at Adaptation Set as well as Sub-Representation levels.

The @value of the SupplementalProperty or EssentialProperty elements using the SRD scheme is a comma separated list of values for SRD parameters. The SRD parameters source_id, object_x, object_y, object_width, and object_height are required to be present and the SRD parameters total_width, total_height, and spatial_set_id are conditionally or optionally present.

source_id is a non-negative integer in decimal representation providing the identifier for the source of the content. The source_id parameter provides a unique identifier, within the Period, for the source of the content. It implicitly defines a coordinate system associated to this source. This coordinate system uses an arbitrary origin (0; 0); the x-axis is oriented from left to right and the y-axis from top to bottom. All SRD sharing the same source_id value have the same origin and axes orientations. Spatial relationships for Spatial Objects using SRD with different source_id values are undefined.

For a given source_id value, a reference space is defined, corresponding to the rectangular region encompassing the entire source content, whose top-left corner is at the origin of the coordinate system. The total_width and total_height values in a SRD provide the size of this reference space expressed in arbitrary units. total_width is a non-negative integer in decimal representation expressing the width of the reference space in arbitrary units. total_height is a non-negative integer in decimal representation expressing the height of the reference space in arbitrary units. It is allowed that there is no Spatial Object in the MPD that covers the entire source of the content, e.g. when the entire source content is represented by two separate videos.

object_x is a non-negative integer in decimal representation expressing the horizontal position of the top-left corner of the Spatial Object in arbitrary units. object_y is a non-negative integer in decimal representation expressing the vertical position of the top-left corner of the Spatial Object in arbitrary units. object_width is a non-negative integer in decimal representation expressing the width of the Spatial Object in arbitrary units. object_height is a non-negative integer in decimal representation expressing the height of the Spatial Object in arbitrary units. The object_x and object_y parameters (respectively object_width and object_height) express 2D positions (respectively 2D sizes) of the associated Spatial Object in the coordinate system associated to the source. The values of the object_x, object_y, object_width, and object_height parameters are relative to the values of the total_width and total_height parameters, as defined above. Positions (object_x, object_y) and sizes (object_width, object_height) of SRDs sharing the same source_id value may be compared after taking into account the size of the reference space, i.e. after the object_x and object_width values are divided by the total_width value and the object_y and object_height values divided by the total_height value of their respective descriptors. Different total_width and total_height values may be used in different descriptors to provide positions and sizes information in different units for the same reference space.

spatial_set_id is a non-negative integer in decimal representation providing an identifier for a group of Spatial Objects. When not present, the Spatial Object associated to this descriptor does not belong to any spatial set and no spatial set information is given. MPD authors can express, using the spatial_set_id parameter, that some Spatial Objects, within a given source_id, have a particular spatial relationship. For instance, an MPD author may group all Adaptation Sets corresponding to tiles at a same resolution level. This way, the spatial_set_id parameter may be used by the DASH client to quickly select spatially related Spatial Objects.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments to enable downloading segments in multiple parts, for example. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If a relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid, for example. This technique may avoid adding a large box at the beginning of the segment and therefore may prevent a possible initial download delay.

Sub-Representations are embedded in regular Representations and are described by the SubRepresentation element. SubRepresentation elements are contained in a Representation element. The SubRepresentation element describes properties of one or several media content components that are embedded in the Representation. It may for example describe the exact properties of an embedded audio component (such as codec, sampling rate, etc., for example), an embedded sub-title (such as codec, for example) or it may describe some embedded lower quality video layer (such as some lower frame rate, or otherwise, for example). Sub-Representations and Representation share some common attributes and elements. In case the @level attribute is present in the SubRepresentation element, the following applies:

Sub-Representations provide the ability for accessing a lower quality version of the Representation in which they are contained. In this case, Sub-Representations for example allow extracting the audio track in a multiplexed Representation or may allow for efficient fast-forward or rewind operations if provided with lower frame rate;

The Initialization Segment and/or the Media Segments and/or the Index Segments shall provide sufficient information such that the data can be easily accessed through HTTP partial GET requests. The details on providing such information are defined by the media format in use.

When ISOBMFF Segments are used, the following applies:

The Initialization Segment contains the Level Assignment box.

The Subsegment Index box ('ssix') is present for each Subsegment.

The attribute @level specifies the level to which the described Sub-Representation is associated to in the Subsegment Index. The information in Representation, Sub-Representation and in the Level Assignment ('leva') box contains information on the assignment of media data to levels.

Media data should have an order such that each level provides an enhancement compared to the lower levels.

If the @level attribute is absent, then the SubRepresentation element is solely used to provide a more detailed description for media streams that are embedded in the Representation.

The ISOBMFF includes the so-called level mechanism to specify subsets of the file. Levels follow the dependency hierarchy so that samples mapped to level n may depend on any samples of levels m, where m<=n, and do not depend on any samples of levels p, where p>n. For example, levels can be specified according to temporal sub-layer (e.g., TemporalId of HEVC). Levels may be announced in the Level Assignment ('leva') box contained in the Movie Extends ('mvex') box. Levels cannot be specified for the initial movie. When the Level Assignment box is present, it applies to all movie fragments subsequent to the initial movie. For the context of the Level Assignment box, a fraction is defined to consist of one or more Movie Fragment boxes and the associated Media Data boxes, possibly including only an initial part of the last Media Data Box. Within a fraction, data for each level appears contiguously. Data for levels within a fraction appears in increasing order of level value. All data in a fraction is assigned to levels. The Level Assignment box provides a mapping from features, such as scalability layers or temporal sub-layers, to levels. A feature can be specified through a track, a sub-track within a track, or a sample grouping of a track. For example, the Temporal Level sample grouping may be used to indicate a mapping of the pictures to temporal levels, which are equivalent to temporal sub-layers in HEVC. That is, HEVC pictures of a certain TemporalId value may be mapped to the a particular temporal level using the Temporal Level sample grouping (and the same can be repeated for all TemporalId values). The Level Assignment box can then refer to the Temporal Level sample grouping in the indicated mapping to levels.

The Subsegment Index box ('ssix') provides a mapping from levels (as specified by the Level Assignment box) to byte ranges of the indexed subsegment. In other words, this box provides a compact index for how the data in a subsegment is ordered according to levels into partial subsegments. It enables a client to easily access data for partial subsegments by downloading ranges of data in the subsegment. When the Subsegment Index box is present, each byte in the subsegment is assigned to a level. If the range is not associated with any information in the level assignment, then any level that is not included in the level assignment may be used. There is 0 or 1 Subsegment Index boxes present per each Segment Index box that indexes only leaf subsegments, i.e. that only indexes subsegments but no segment indexes. A Subsegment Index box, if any, is the next box after the associated Segment Index box. A Subsegment Index box documents the subsegment that is indicated in the immediately preceding Segment Index box. Each level may be assigned to exactly one partial subsegment, i.e. byte ranges for one level are contiguous. Levels of partial subsegments are assigned by increasing numbers within a subsegment, i.e., samples of a partial subsegment may depend on any samples of preceding partial subsegments in the same subsegment, but not the other way around. For example, each partial subsegment contains samples having an identical temporal sub-layer and partial subsegments appear in increasing temporal sub-layer order within the subsegment. When a partial subsegment is accessed in this way, the final Media Data box may be incomplete, that is, less data is accessed than the length indication of the Media Data Box indicates is present. The length of the Media Data box may need adjusting, or padding may be used. The padding_flag in the Level Assignment Box indicates whether this missing data can be replaced by zeros. If not, the sample data for samples assigned to levels that are not accessed is not present, and care should be taken.

MPEG-DASH defines segment-container formats for both ISOBMFF and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be are defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level1 elements and padding. A Segment Index of DASH may comprise a Cues Element of Matroska.

DASH supports rate adaptation by dynamically requesting Media Segments from different Representations within an Adaptation Set to match varying network bandwidth. When a DASH client switches up/down Representation, coding dependencies within Representation have to be taken into account. A Representation switch may happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initializing data in the Initialization Segment, if any). Hence, Representation switching can be performed in SAP.

Several types of SAP have been specified, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

In some video coding standards, such as MPEG-2, each intra picture has been a random access point in a coded sequence. The capability of flexible use of multiple reference pictures for inter prediction in some video coding standards, such as H.264/AVC and H.265/HEVC, has a consequence that an intra picture may not be sufficient for random access. Therefore, pictures may be marked with respect to their random access point functionality rather than inferring such functionality from the coding type; for example an IDR picture as specified in the H.264/AVC standard can be used as a random access point. A closed group of pictures (GOP) is such a group of pictures in which all pictures can be correctly decoded. For example, in H.264/AVC, a closed GOP may start from an IDR access unit (or from an intra coded picture with a memory management control operation marking all prior reference pictures as unused).

An open group of pictures (GOP) is such a group of pictures in which pictures preceding the initial intra picture in output order may not be correctly decodable but pictures following the initial intra picture are correctly decodable. Such an initial intra picture may be indicated in the bitstream and/or concluded from the indications from the bitstream, e.g. by using the CRA NAL unit type in HEVC or the recovery point SEI message in H.264/AVC. The pictures preceding the initial intra picture starting an open GOP may be referred to as leading pictures. There are two types of leading pictures: decodable and non-decodable. Decodable leading pictures are such that can be correctly decoded when the decoding is started from the initial intra picture starting the open GOP. In other words, decodable leading pictures use only the initial intra picture or subsequent pictures in decoding order as reference in inter prediction. Non-decodable leading pictures are such that cannot be correctly decoded when the decoding is started from the initial intra picture starting the open GOP.

As described above, the client or player may request Segments or Subsegments to be transmitted from different representations similarly to how the transmitted layers and/or sub-layers of a scalable video bitstream may be determined. Terms representation down-switching or bitstream down-switching may refer to requesting or transmitting a lower bitrate representation than what was requested or transmitted (respectively) previously. Terms representation up-switching or bitstream up-switching may refer to requesting or transmitting a higher bitrate representation than what was requested or transmitted (respectively) previously. Terms representation switching or bitstream switching may refer collectively to representation or bitstream up- and down-switching and may also or alternatively cover switching of representations or bitstreams of different viewpoints.

Streaming systems similar to MPEG-DASH include for example HTTP Live Streaming (a.k.a. HLS), specified in the IETF Internet Draft draft-pantos-http-live-streaming-19 (and other versions of the same Internet Draft). As a manifest format corresponding to the MPD, HLS uses an extended M3U format. M3U is a file format for multimedia playlists, originally developed for audio files. An M3U Playlist is a text file that consists of individual lines, and each line is a URI, blank, or starts with the character '#' indicating a tag or a comment. A URI line identifies a media segment or a Playlist file. Tags begin with #EXT. The HLS specification specifies a number of tags, which may be regarded as key-value pairs. The value part of tags may comprise an attribute list, which is a comma-separated list of attribute-value pairs, where an attribute-value pair may be considered to have the syntax AttributeName=AttributeValue. Hence, tags of HLS M3U8 files may be considered similar to Elements in MPD or XML, and attributes of HLS M3U8 files may be considered similar to Attributes in MPD or XML. In some versions of HLS, media segments are formatted according to the MPEG-2 Transport Stream and contain a single MPEG-2 Program. Each media segment is recommended to start with a Program Association Table (PAT) and a Program Map Table (PMT). In some versions of HLS, media segments are self-containing ISOBMFF movie fragments, similarly to DASH (Sub)Segments.

An end-to-end DASH system may be constructed as follows. The media content is provided by an origin server, which is typically a conventional web (HTTP) server. The origin server may be connected with a Content Delivery Network (CDN) over which the streamed content is delivered to and stored in edge servers. The MPD allows signaling of multiple base URLs for the content, which can be used to announce the availability of the content in different edge servers. Alternatively, the content server may be directly connected to the Internet. Web proxies may reside on the path of routing the HTTP traffic between the DASH clients and the origin or edge server from which the content is requested. Web proxies may cache HTTP messages and hence can serve clients' requests with the cached content. They are commonly used by network service providers, since they reduce the required network bandwidth from the proxy towards origin or edge servers. For end-users HTTP caching provides shorter latency. DASH clients may be connected to the Internet through an access network, such as a mobile cellular network.

ISO/IEC 23009-5 specifies server and network assisted DASH (SAND), which introduces messages between DASH clients and network elements or between various network elements for the purpose to improve efficiency of streaming sessions by providing information about real-time operational characteristics of networks, servers, proxies, caches, CDNs as well as a DASH client's performance and status. For example, the AnticipatedRequests SAND message allows a DASH client to announce to a DASH-ware network element (DANE) which specific set of segments it is interested in. The intent is to signal the set of segments in representations that the DASH client is likely to select and request soon. The message payload includes a list of anticipated requests, each including a URL of the requests, optionally a byte range for the request (when only a part of the content referred to by the URL is expected to be requested), and optionally a time at which the DASH client expects to issue the request for the resource identified by the URL.

Virtual reality video content may use different projection formats. The term "360° video" may be used interchangeably with the term "virtual reality video". A specific projection from a spherical image covering 360-degree field-of-view horizontally and 180-degree field-of-view vertically to a rectangular two-dimensional image plane is known as equirectangular projection. In this case, the horizontal coordinate may be considered equivalent to a longitude, and the vertical coordinate may be considered equivalent to latitude, with no transformation or scaling applied. In some cases, panoramic content with 360-degree horizontal field-of-view but with less than 180-degree vertical field-of-view may be considered special cases of equirectangular projection, where the polar areas of the sphere have not been mapped onto the two-dimensional image plane. The equirectangular projection preserves the straightness of the vertical lines but distorts the nadir and zenith areas.

In cubemap projection format (a.k.a. cube map), spherical video is projected onto the six faces (a.k.a. sides) of a cube. The cubemap may be generated, for example, by first rendering the spherical scene six times from a viewpoint, with the views defined by a 90 degree view frustum representing each cube face. The cube sides may be frame-packed into the same frame or each cube side may be treated individually (in encoding, for example). There are many possible orders of locating cube sides onto a frame and/or cube sides may be rotated or mirrored. The frame width and height for frame-packing may be selected to fit the cube sides "tightly" e.g. at 3×2 cube side grid, or may include unused constituent frames e.g. at 4×3 cube side grid.

In an example, virtual reality content may be processed in accordance with example process 1100 as illustrated in FIG. 10 or in accordance with subsets and/or variants thereof. As shown, in FIG. 10, virtual reality content is acquired at block 1102, such as by one or more virtual reality camera, other camera arrays, and/or other audiovisual equipment suitable for capturing virtual reality content. As shown in FIG. 10, images acquired at block 1102 may be passed to block 1104, where image stitching, projection, and mapping may be performed. Audio acquired at block 1102 may be, in some implementations, passed to block 1106 for audio encoding, while the stitched, projected, and mapped images from block 1104 may be passed to block 1108 and/or block 1110 for video and/or image encoding. As depicted at block 1112 in FIG. 10, a file encapsulator takes the encoded media content including video, image, and audio from blocks 1106, 1108 and 1110 as input and encapsulates them into a container file. The file encapsulator may also receive and incorporate metadata into the file, such as projection and mapping information assisting in rendering the decoded packed VR frames. In implementations involving DASH, as shown in FIG. 10, a DASH MPD generator takes the file as input and generates at block 1114 an MPD, which may include VR-specific metadata such as projection and mapping metadata that can be generated on the basis of the equivalent information in the file. After DASH MPD generation at block 1114, DASH client/server transport is performed at block 1116.

As shown at block 1118 in FIG. 10, during file playback, a file decapsulator processes the file and/or the received (Sub)Segments and extracts the coded bitstreams from tracks and parses the metadata. Audio information, video information, and image information are decoded at blocks 1120, 1122, and 1124, respectively. The decoded packed VR frames generated by block 1122 and/or 1124 may be rendered at block 1130, which optionally involves the use of projection and/or mapping information received from the file decapsulator. As shown at block 1132, the rendered images are projected onto the screen of a head-mounted display or any other display device based on the current viewing orientation and the projection and mapping metadata parsed from the file. Similarly, audio that is rendered at block 1126 may be output at block 1128 via loudspeakers and/or headphones.

A depiction of an example breakdown of image stitching, projection, and mapping process 1200 is illustrated with FIG. 11 and described as follows. VR images or video clips are typically captured using multiple cameras or a camera device equipped with several lenses and sensors. Input pictures 1204 from the multiple cameras are stitched and projected at block 1206 onto a three-dimensional geometrical structure, such as a sphere or a cube. The image data on the geometrical structure is further arranged onto a two-dimensional projected frame 1208, the format of which may be indicated with a VR projection format indicator at block 1210. In an example, the mapping comprises mapping rectangular regions of the projected frame onto a packed VR frame 1212 by indicating the location and size of each region in the packed VR frame 1212. In an example, the mapping additionally comprises one or both of mirroring and rotation of the rectangular regions of the projected frame onto a packed VR frame 1212, wherein the mirroring may be limited to horizontal and vertical mirroring and rotation may be limited to steps of 90 degrees. In practice, the input picture(s) may be converted to a packed VR frame 1212 in one process without intermediate steps, which is indicated by the dashed rectangle 1202 in FIG. 11. The packed VR frame is provided as input for the video encoding 1108 and/or image encoding 1110. The term packed VR frame may also be used when only a single rectangular region of the projected frame onto the packed VR frame or when the packed VR frame contains the projected frame as such. The term packed VR frame may be defined as the frame that results from mapping of a projected frame.

A projection structure may be defined as the three-dimensional structure consisting of one or more surface(s) on which the VR image/video content is projected. The projected frame may be defined as a two-dimensional frame on which the surface(s) of the projection structure are mapped. A projected frame may be alternatively or additionally defined as a frame that has a representation format that is defined by a VR projection format indicator. For example, the projection structure for a cube map projection is a cube, and a cube map is a two-dimensional projected frame formed by unfolding the cube faces. A VR projection format indicator may for example be an enumerated type indicating a representation format of a projected frame. For example, the indicator may indicate one of a monoscopic equirectangular panorama, a stereoscopic equirectangular panorama, a monoscopic cube map, and a stereoscopic cube map. When a stereoscopic projection format is indicated, a certain packing arrangement may be pre-defined or separately indicated. For example, a top-bottom packing arrangement may be pre-defined, where for example the left view may be defined to appear on top.

In some examples, several versions of VR video are encoded, each targeted for different viewing orientation. Consequently, the orientation of the projection structure, such as a sphere or a cube, is rotated according to the targeted viewing orientation. There may be different ways to indicate the orientation of the projection structure or the respected projected frame relative to a global coordinate system. For example, a primary point may be defined for the projection format, such as the center point in an equirectangular panorama picture or the center point of the front face of a cube map. Yaw and pitch may indicate the location of the primary point in the global coordinate system. The orientation of the projection structure or the corresponding projected frame may be indicated by roll, which indicated how a primary plane that is orthogonal to the reference direction is rotated.

The term global orientation offset may be defined as the yaw, pitch, and roll relative to the reference orientation that corresponds, in the rendering system or the global coordinate system, to (yaw, pitch, roll) equal to (0, 0, 0). The reference orientation may be defined as the orientation of a two-dimensional surface that is orthogonal to the reference direction and has roll angle of zero degrees. The reference direction may be defined as the direction of the z-axis of the global coordinate system or z-axis of the coordinate system for camera parameters or of the axis for zero azimuth angle and zero elevation angle of a microphone setup. Consequently, global orientation offsets may, for example, be used to correct the camera or content orientation after encoding the content. For example, if the horizon line of the content is not exactly horizontal (such as if the content was shot with a camera that was slightly tilted in its orientation, for example), it may be fixed by VR orientation metadata.

Global orientation offsets may be included in a file for example in one or more of the following ways: i) A global orientation offset applying to a set of samples (e.g. for an entire track) may be included in a sample entry of an ISOBMFF compliant file. ii) A sample group may be defined for global orientation offset, where each sample group description entry defines a combination of yaw, pitch, and roll values, and the SampleToGroupBox is used to map samples of a track to sample group description entries. iii) A VR orientation as a metadata track is defined as follows: When present, a VR orientation metadata track contains a track reference, e.g. of type 'cdsc', to each video track and each audio track that share the same global orientation offset data. When present, this metadata specifies the global orientation offset. When this track is absent, the value for the global orientation offset is (0, 0, 0) for yaw, pitch, and roll, respectively. The global orientation offset provided in a sample of a VR orientation metadata track applies to all time-parallel audio and video samples of the tracks associated with the VR orientation metadata track using a track reference of type 'cdsc'. A time-parallel sample for a particular sample in a particular track may defined as the sample in the referenced track that has the same or, when a sample with the same decoding time is not available, the closest preceding decoding time relative to that of the particular sample in the particular track.

Global orientation offsets may be applied throughout a VR audio-video presentation. In rendering, the orientation of the head-mounted display (relative to the initial orientation of the head-mounted display) is essentially summed up with the global orientation offset prevailing at that moment to select an orientation used to extract from the decoded content. For example, when video towards orientation (a, b, c) for yaw, pitch, and roll, respectively, is to be rendered e.g. on a head-mounted display and the global orientation offset is (i, j, k) for yaw, pitch, and roll, respectively, the video information corresponding to the orientation has yaw, pitch, and roll equal to (a-i, b-j, c-k), respectively, in the file.

When selecting a track or Representation to be decoded and/or data to be extracted from the decoded content, the orientation of the projection structure or the projected frame (relative to the global coordinate system) may be taken into account. For example, if the projection structure is a cube indicated to have 45-degree yaw angle and 0-degree pitch and roll angles, and the current viewing orientation has yaw, pitch, and roll equal to 0, the content from the decoded cube map is selected to be rendered so that the center point for the rendered content is 45-degrees off around the Y-axis (i.e. horizontally in the projected frame).

In some examples, global orientation offset(s) are included in the information of the orientation of the projection structure or projected frame, and hence they need not be separately considered when selecting decoded data for rendering. In some examples, global orientation offset(s) are separate from the information of the orientation of the projection structure or projected frame, and hence they need to be jointly considered when selecting decoded data for rendering, essentially by summing them with proper signs.

A method, apparatus and computer program product are provided in accordance with example embodiments in order to control the observation point and orientation selection for visual content, such as audiovisual virtual reality content. Many of the example embodiments and implementations described or otherwise contemplated herein arise in contexts where audiovisual content, including but not limited to virtual reality content, is streamed to a viewer. One of the technical challenges associated with the development, transmission, and viewing of virtual reality content resides in the potential for a viewer, through their orientation, positioning, or otherwise, to tend to view portions of the virtual reality content that may not be the most salient portions of the content. A content creator or author typically presents the content that is deemed most salient and/or interesting in particular, chosen locations within the potential field of view of a user. These chosen locations can be considered the most probable viewing direction (MPVD), as viewers generally tend to be more interested in the salient and/or interesting content presented therein, and thus tend to position themselves in a manner that allows them to readily view that content. However, because virtual reality presentations and other immersive content presentations often permit the viewer to change their perspective and/or viewing orientation based on the positioning of the viewer and their head-mounted viewing device, there is a significant likelihood that when a user starts to play such content, their positioning and/or orientation results in scenarios where the content is rendered such that the viewer is misaligned with the most salient and/or interesting content, and the viewer must move and/or adopt a less comfortable viewing position to become aligned with the MPVD. For example, a viewer may need to look directly behind themselves to find the MPVD. In another example, the viewer's positioning on a sofa or chair may require the viewer to adopt physically uncomfortable body positioning to realign themselves with the MPVD.

In some such contexts, a recent trend in streaming protocols directed to reducing the streaming bitrate of VR video involves transmitting a subset of 360-degree video content covering the current view orientation at the best quality/resolution, while transmitting the remaining portions of the 360-degree video at a lower quality/resolution. Some such contexts, and other contexts in which example embodiments of the invention may be implemented, contemplate the use of dynamic adaptive streaming over HTTP ("DASH") for virtual reality content.

In some implementations of DASH, the automated selection between Representations in the same Adaptation Set can be performed based on, for example, the width and height (which may be referenced as @width and @height, respectively); the frame rate (which may be referenced as @frameRate); the bitrate (which may be referenced as @bandwidth); and/or an indicated quality ordering between the Representations (which may be referenced as @qualityRanking). In some example implementations of DASH, the semantics of @qualityRanking are specified such that @qualityRanking specifies a quality ranking of the Representation relative to other Representations in the same Adaptation Set. Typically, lower values represent higher quality content. In an implementation of DASH, if an @qualityRanking attribute is not present, then no ranking is defined.

In the context of virtual reality video content, some viewports of the 360-degree content may be represented by better quality while other viewports may be represented by lower quality. However, it will be appreciated that none of the attributes discussed above is sufficient to make a distinction between 360-degree video that is coded for a different primary viewport.

In order to facilitate viewport-based adaptation in DASH, MPD may comprise metadata that indicates the primary viewport of a Representation. Moreover, in order to enable selection of Representations based on the picture quality of the primary viewport, the MPD may include means for indicating the quality for the primary viewport separately from the overall quality characteristics. One or more property descriptors or Elements may be used for indicating the primary viewport and/or quality for the primary viewport. Examples of such are provided in the following paragraphs.

In an example, a VR video descriptor (VRD) serves two purposes: 1) It indicates which viewports are present in a (Sub)Representation. 2) It indicates viewport-specific quality ranking. The following pieces of information are conveyed in the VR video descriptor: the viewport(s) represented by the content, the projection format for the viewport(s), indication whether content for the viewport(s) is monoscopic or stereoscopic, and in the case of stereoscopic content if the left or right or both views are present, quality ranking value(s) for the viewport(s). Viewport-specific quality ranking information enables clients to make a distinction between Representations and Sub-Representations representing the same viewport(s) but with different qualities. The @value of the SupplementalProperty or EssentialProperty elements using the VRD scheme is a comma separated list of values for VRD parameters specified in the following table:

| EssentialProperty @value or SupplementalProperty@value parameter | Use | Description |
| --- | --- | --- |
| vr_source_id | M | non-negative integer in decimal representation providing the identifier for the source of the content |
| view_idc | M | 0 indicates that the viewport is monoscopic, 1 indicates that the viewport is the left view of stereoscopic content, 2 indicates that the viewport is the right view of stereoscopic content, 3 indicates that the viewport contains both the left and right views. Other values are reserved. |
| projection_format | M | specifies the projection format of the viewport, as specified in [CICP] |

-continued

| EssentialProperty @value or SupplementalProperty@value parameter | Use | Description |
|---|---|---|
| viewport_yaw | M | decimal floating point value as specified in [CICP] or string "NA" indicating that the viewport covers the remaining field of view not covered by the other VRD SupplementalProperty or EssentialProperty elements in the same containing element. |
| viewport_pitch | M | decimal floating point value as specified in [CICP] or string "NA". When viewport_yaw is equal to NA, viewport_pitch shall be equal to NA. |
| viewport_hor_fov | M | decimal floating point value as specified in [CICP] or string "NA". When viewport_yaw is equal to NA, viewport_hor_fov shall be equal to NA. |
| viewport_ver_fov | M | decimal floating point value as specified in [CICP] or string "NA". When viewport_yaw is equal to NA, viewport_ver_fov shall be equal to NA. |
| quality_ranking | O | specifies a quality ranking of the viewport relative to other Representations (with associated @qualityRanking) in the same Adaptation Set and viewports with the same vr_source_id value in any Adaptation Set. Lower values represent higher quality content. If not present then no ranking is defined. |

Legend:
M = Mandatory,
O = Optional

In an embodiment, the projection and mapping metadata in a file (e.g. compliant with ISO base media file format) and/or in the VR-specific descriptors of MPD includes one or more of the following: i) the VR projection format of the projected frame, ii) the orientation of the geometric structure corresponding to the projected frame in the global coordinate system, iii) region-wise mapping information, iv) region-wise quality ranking.

In an embodiment, a virtual reality video descriptor (VRD) is specified as follows. The VRD scheme uses SupplementalProperty and/or EssentialProperty descriptors with a particular @schemeIdUri value. An EssentialProperty descriptor should be used when displaying the decoded video content on a conventional two-dimensional display is undesirable without projection-aware display processing. VR video SupplementalProperty or EssentialProperty descriptors may be present in AdaptationSet, Representation, or SubRepresentation. The @value of the SupplementalProperty or EssentialProperty elements using the VRD scheme is a comma separated list of values for VRD parameters specified in the following table:

| EssentialProperty @value or SupplementalProperty@value parameter | Use | Description |
|---|---|---|
| vr_source_id | M | specifies the identifier for the source of the content. The coordinate system is identical in all Representations associated with the same vr_source_id value. |
| projection_format | M | VR projection format indicator, specifies the projection format of the projected frame |
| global_yaw | M | decimal floating point value specifying the yaw of the projection in degrees relative to the global coordinate system |
| global_pitch | M | decimal floating point value specifying the pitch of the projection in degrees relative to the global coordinate system |
| global_roll | M | decimal floating point value specifying the rollof the projection in degrees relative to the global coordinate system |

Legend:
M = Mandatory,
O = Optional

In an embodiment, the SRD descriptor is extended as follows: SRD descriptors are allowed also in Representation level. Many SRD descriptors are allowed in the same Representation and SubRepresentation element. Multiple SRD descriptors in the same container element are useful for example when SRD descriptors are used to indicate several regions within the projected frame and at least some of the regions are indicated to have a different quality ranking compared to others. The syntax and semantics of the SRD descriptor may be like described above. However, object_x, object_y, object_width, and object_height may be defined to be optional if there is another SRD descriptor in the same container element with the values being present. If object_x, object_y, object_width, and object_height are absent, the respective region is defined as the projected frame excluding the other specified regions in the same level. A quality_ranking parameter may be defined in the SRD, e.g. as a last parameter, as follows:

| quality_ranking | O | specifies a quality ranking of the region relative to other Representations (with associated @qualityRanking) in the same Adaptation Set and (Sub)Representations with the same vr_source_id value in any Adaptation Set. Lower values represent higher quality content. If not present then no ranking is defined. |
|---|---|---|

Some implementations of example embodiments of the invention contemplate and/or arise in environments that involve DASH events, including but not limited to those described and otherwise presented in ISO/IEC 23009-1, which is hereby incorporated by reference.

It will be appreciated that DASH events may be provided in a media presentation description (MPD) or within a Representation in order to signal aperiodic information to the DASH client or to an application. Events are timed, in the sense that each event starts at a specific media presentation time and typically has a duration. Events include DASH specific signaling or application-specific events. In the latter case, a proper scheme identifier identifies the application such that the DASH client can forward the event to the proper application.

In some implementations, Events of the same type are clustered in Event Streams. Doing so enables a DASH client to subscribe to an Event Stream of interest and ignore Event Streams that are of no relevance or interest. It will also be appreciated that two ways of signaling events have been specified: events signaled in the MPD and events signaled inband in the Segments. A sequence of events assigned to the media presentation time may be provided in the MPD on the Period level. Events of the same type are summarized in an Event Stream that is specified by an EventStream element in a Period element. Typically, Events terminate at the end of a Period even if the start time is after the Period boundary or the duration of the event extends beyond the Period boundary.

In most DASH-based contexts, the EventStream element is structured in a similar way as DASH property descriptors, in the sense that it contains a @schemeIdUri attribute that provides a uniform resource identifier (URI) to identify the scheme and an optional attribute @value. The semantics of the element are specific to the scheme employed. The URI identifying the scheme may be a uniform resource name (URN) or a uniform resource locator (URL).

Likewise, in most DASH-based contexts, a Period contains at most one EventStream element with the same value of the @schemeIdUri attribute and the value of the @value attribute. For example, all Events of one type may be clustered in one Event Stream. It will be appreciated that as Event Streams contain timed events, a time scale attribute @timescale is also provided to assign events to a specific media presentation time within the Period. The timed events themselves are described by the Event element.

Those familiar with DASH will recognize the specified semantics of the attributes within an EventStream element, which are provided below.

| Element or Attribute Name | | Use | Description |
| --- | --- | --- | --- |
| EventStream | | | specifies event Stream |
| | @xlink:href | O | specifies a reference to an external EventStream element |
| | @xlink:actuate | OD default: onRequest | specifies the processing instructions, which can be either "onLoad" or "onRequest". This attribute shall not be present if the @xlink:href attribute is not present. |
| | @schemeIdUri | M | identifies the message scheme. The string may use URN or URL syntax. When a URL is used, it is recommended to also contain a month-date in the form mmyyyy; the assignment of the URL must have been authorized by the owner of the domain name in that URL on or very close to that date. A URL may resolve to an Internet location, and a location that does resolve may store a specification of the message scheme. |
| | @value | O | specifies the value for the event stream element. The value space and semantics must be defined by the owners of the scheme identified in the @schemeIdUri attribute. |
| | @timescale | O | specifies the timescale in units per seconds to be used for the derivation of different real-time duration values in the Event elements. If not present on any level, it is set to 1. |

| Element or Attribute Name | Use | Description |
| --- | --- | --- |
| Event | 0 . . . N | specifies one event. Events in Event Streams are ordered such that their presentation time is non-decreasing. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

Those familiar with DASH will recognize the specified semantics of the attributes within an Event element, which are provided below.

| Element or Attribute Name | | Use | Description |
| --- | --- | --- | --- |
| Event | | | specifies an event and contains the message of the event, formatted as a string. The content of this element depends on the event scheme. |
| | @presentationTime | OD default: 0 | specifies the presentation time of the event relative to the start of the Period. The value of the presentation time in seconds is the division of the value of this attribute and the value of the @timescale attribute. If not present, the value of the presentation time is 0. |
| | @duration | O | specifies the presentation duration of the event. The value of the duration in seconds is the division of the value of this attribute and the value of the @timescale attribute. If not present, the value of the duration is unknown. |
| | @id | O | specifies an identifier for this instance of the event. Events with equivalent content and attribute values in the Event element shall have the same value for this attribute. The scope of the @id for each Event is with the same @schemeIdURI and @value pair. |
| | @messageData | O | specifies the value for the event stream element. The value space and semantics must be defined by the owners of the scheme identified in the @schemeIdUri attribute. NOTE: this attribute is an alternative to specifying a complete XML element(s) in the Event. It is useful when an event leans itself to a compact string representation |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

Those familiar with DASH will recognize that Event streams may be multiplexed with Representations by adding the event messages as part of the Segments. The event streams may be present in selected Representations, in one (or several) selected Adaptation Set or in all Representations. For example, one possible configuration is one where only the audio Adaptation Sets may contain inband events. If more than one Representation carries event streams with the same @schemeIdUri and the same @value, the streams are semantically equivalent, such that processing one Representation is sufficient.

In DASH environments, an inband event stream that is present in a Representation is indicated by an InbandEventStream element on an Adaptation Set or Representation level. The syntax and semantics of an InbandEventStream element may be the same as those for the EventStream element, as described above. One Representation may contain multiple inband Event streams, each indicated by a separate InbandEventStream element.

In DASH, the Event Message box ('emsg') provides signaling for generic events related to the media presentation time. The same semantics as for an Event defined in the MPD above apply, and the semantics of fields of the Event Message box are similar to the semantics of the respective attributes of the Event element. A Media Segment if encapsulated in ISO base media file format (ISOBMFF) may contain one or more event message ('emsg') boxes. If present, any 'emsg' box are placed before any 'moof' box. It will be appreciated that the syntax of the Event Message box may be specified as follows:

```
aligned(8) class DASHEventMessageBox extends FullBox('emsg',
version = 0, flags = 0){
    string              scheme_id_uri;
    string              value;
    unsigned int(32)    timescale;
    unsigned int(32)    presentation_time_delta;
    unsigned int(32)    event_duration;
    unsigned int(32)    id;
    unsigned int(8)     message_data[ ];
    }
}
```

Regardless of the precise protocols and/or environment in which example embodiments of the invention are implemented, several technical challenges arise from the need to present content at a quality level that meets the expectations and/or requirements of the viewer and/or content creator, and the potential misalignment of the viewer and/or the viewer's display and the orientation of the content presented to the viewer.

The ability to signal an initial observation orientation or an initial viewport for VR content is a desirable feature, such that a content author's preference is obeyed when starting a VR playback session. An initial observation orientation or initial viewport may not only be assigned to the beginning of a VR presentation but also to any random access point or even to any point in the VR presentation. However, a need exists for the ability to indicate the "strength" of the initial observation orientation or the initial viewport signaling. For example, when a viewer has watched a part of the content earlier and seeks to view another part of the content, the need exists to permit the content creator/author to be able to control (1) whether the content playback after seeking continues using the user's head orientation (or more generally, the user's previous orientation to view the content), or (2) whether the signaled initial viewing orientation or viewport should be applied.

The former may be used advantageously, for example, when the content is generated with a stationary VR camera or camera rig without actual scene cuts or when there were no scene cuts between the previous viewing position and the seek position. The latter may be used advantageously, for example, when the position of the camera changed or there was a scene cut between the previous viewing position and the seek position, or when no content of the same video was viewed before. Furthermore, some points in the presentation (such as scene cuts, for example) may be such that the content author wishes to select the observation orientation no matter what the earlier orientation of the head-mounted display was.

Moreover, in DASH, the initial observation setup signaling should be available for a DASH client so that the client can request a (Sub)Segment from a correct Adaptation Set and Representation. When each Representation in an Adaptation Set covers the same viewport with constituent viewports of different quality, the signaling should enable a DASH client to select the Representation that has a good-quality constituent viewport exactly or approximately matching the initial observation orientation or the initial viewport. When each Representation in an Adaptation Set covers the same relatively narrow viewport, typically without constituent viewports, and there are several Adaptation Sets, each covering a different viewport of the same omnidirectional content, the signaling should enable a DASH client to select the Adaptation Set that exactly or approximately matches the initial observation orientation or the initial viewport and subsequently a good-quality Representation from that Adaptation Set.

Current technology does not appear to address these technical needs. For example, MPEG M38689 (which is incorporated herein by reference) discusses the initial viewport signaling in DASH MPD as follows:

In order to have an initial point of view and to define an origin axis from which all angles positions can be computed from, we introduce a new supplemental property for the adaptation set in which the center point is located. The position of the center point is given in pixel units from the top left corner of the grid cell in which it is located.

Such supplemental property is defined by a urn (for instance: urn:mpeg:dash:vrorigin:2016) and a value that contains x and y coordinates in pixel units (for instance: "640,360").

Note that alternatively the VR origin supplemental property may be set on the adaptation set associated to the whole spatial object. This nevertheless requires more computation at the time of MPD authoring (since width and depths of all cells between the VR origin and the top left corner of the whole spatial object need to be summed).

It will be appreciated that MPD descriptors are static, in the sense that they are not time-varying or dynamic entities. Hence, M38689 is not capable of indicating an initial viewport as a function of time or per SAP, for example. Consequently, M38689 does not help a DASH client to select an appropriate Adaptation Set and/or Representation.

FIG. 1 depicts an example system environment 100 in which implementations in accordance with an example embodiment of the present invention may be performed. The depiction of environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

As shown in FIG. 1, system environment 100 includes at least one camera 102. Many implementations of system environment 100 contemplate the use of one or more cameras that are suitable for capturing 360° video images for use in the production of virtual reality content, such as Nokia's OZO system, and/or other cameras or camera arrays that can be used to create 360° video images and/or other panoramic views. FIG. 1 also contemplates the existence of one or more media sources 104, which may be a database, other device and/or other system which allows for the transmission and/or access of audiovisual content that has been previously captured or otherwise generated.

As shown in FIG. 1, camera 102 and media source 104 are capable of and/or configured to transmit images and/or other audiovisual content, such as 360° video images, as a data stream. Such transmission can be accomplished in accordance with any approach and/or protocol that is suitable for transmitting image data from a camera to one or more devices. In some implementations, transmissions of image data are sent wirelessly or over a wired connection, in real time or near real time, to one or more devices configured to receive and/or process video images.

Some example implementations herein contemplate a saliency point or region, such as a point or a region in a 360° image, that is considered to be the most salient point or region within the image to which attention should be directed. Some example implementations herein contemplate the presence within an image of one or more points-of-interest or regions-of-interest, which are considered to be image elements that may be of interest to a content creator and/or one or more viewers. In many situations, the saliency point of an image will be a point-of-interest and respectively the saliency region of an image will be a region-of-interest. Moreover, the saliency point or region of an image may change and/or be changed, such as being changed automatically by a system or system element and/or by an external actor such as a director. In some such situations, the saliency point or region may be switched from one point-of-interest ore region-of-interest, respectively, to another. It will be appreciated that while embodiments are described below with reference to the term saliency point, such example embodiments and other example embodiments may apply equal to saliency regions used in place of saliency points.

As shown in FIG. 1, camera 102 and media source 104 may transmit their respective video image streams to a video processor 106. Video processor 106 is representative of any of a class of devices that may be implemented as stand-alone devices and/or devices that may be integrated into other devices or components. As shown in FIG. 1, video processor 106 is configured to receive the image data streams and any related information from each of camera 102 and media source 104. In some example implementations, video processor 106 is also configured to permit the selection and/or identification of one or more saliency points in a video stream. In some example embodiments, video processor 106 embeds information indicative of that saliency point into the video stream or a separate stream (or a signaling structure, such as Media Presentation Description) associated with the video stream. In some example embodiments, video processor 106 regards that saliency point as an indication associated with an intended behavior of a playback device, determines the intended behavior of the playback device, and in response to determining the intended behavior of the playback device, causes a control signal to be generated, wherein the control signal is associated with a rendering operation of the audiovisual presentation on the playback device. Said control signal may for example be included in a video stream or be included in description of a video stream.

Director 108 is shown as an optional operator of video processor 106, and, in some implementations, is capable of monitoring and/or controlling one or more image data streams during the production and/or streaming of the image data streams. In some example embodiments director 108 causes information indicative of a saliency point to be embedded into a particular location in a video stream. In some example embodiments director 108 determines the intended behavior of the playback device and causes a control signal to be generated, wherein the control signal is associated with a rendering operation of the audiovisual presentation on the playback device. Said control signal may for example be included in a video stream or be included in description of a video stream. Director 108 may additionally or alternatively make creative decisions regarding the content presented in a video stream, and the relative arrangement of subjects, background elements, and other objects within the work. As noted above, the director 108 is optional in environment 100, and implementations are possible where one or more saliency points are embedded in a video stream by video processor 106, the action of some other device, or otherwise without the presence of or action by a director or other entity.

As depicted in FIG. 1, video processor 106 sends audiovisual content over a network 110. It will be understood that the actual sending apparatus may be a different entity from a video processor entity but that these entities are operationally connected and hence depicted as a single video processor 106. The sending apparatus may for example be an HTTP server (such as a web server, for example) in some embodiments. Network 110 may be any network suitable for the transmission of 360° video and related orientation information, directly and/or indirectly, from one or more devices, such as video processor 106, to a viewing device, such as virtual reality headset 114. While a viewing device is depicted as a single apparatus in FIG. 1, it will be understood that a viewing device may generally comprise several devices that are operationally connected. For example, a virtual reality headset may be connected to a computer that receives the audiovisual content over the network 110. In another example, a virtual reality headset uses as its display device a smartphone that is attached to the headset and receives the audiovisual content over the network 110. In some implementations, the network 110 includes and/or incorporates the public Internet.

FIG. 1 also depicts a user 112, who is associated with a viewing device, such as virtual reality headset 114. In general, virtual reality headset 114 is capable of receiving one or more data streams, such a one or more 360° image data streams (along with the corresponding orientation information), and rendering visible images that can be displayed to the user 112. In some implementations, virtual reality headset 114 is also capable of ascertaining positional information about the user 112, such as the angle and/or degree to which the user 112 has turned his or her head, and other information about the movement of the user 112 or the user 112's head. While FIG. 1 depicts user 112 as viewing content via a virtual reality headset 114, the user may view content via any viewing system that is configured to display all or part of the video transmitted to the user. For example the user may use one or more monitors, mobile device, and/or other handheld or desktop displays to view content. When the display is configured to display part of the 360° content at any single point of time, the user 112 may be given controls which part of the content is displayed. For example, the user 112 may be able to control the viewing direction e.g. using a keyboard, joystick, mouse or any other input peripheral or by rotating or turning the display device, such as a smartphone.

In an embodiment, statistics on users' viewing behavior of a VR video clip are collected. For example, a player may report the viewing directions or orientation (e.g., the orientation of the virtual reality headset 114 with respect to its initial orientation at the start of playing the clip) as a function of media time of the clip to a server collecting the statistics. By collecting the reported viewing directions, the most probable viewing direction (MPVD) may be formed as a function of media time of the clip. The MPVD may be understood to indicate the direction or the region that is statistically most likely rendered to users. The MPVD may be provided to the director 108 as input for assisting creative decisions. Alternatively, the MPVD may be used as such by the video processor 106 as a saliency point to be embedded into a particular location in a video stream. Alternatively, the video processor 106 regards the MPVD as an indication associated with an intended behavior of a playback device, determines the intended behavior of the playback device, and in response to determining the intended behavior of the playback device, causes a control signal to be generated, wherein the control signal is associated with a rendering operation of the audiovisual presentation on the playback device. This embodiment enables the viewing behavior of an initial set of users to assist in or determining the selection of saliency points and hence improving the viewing experience of subsequent users.

Based at least in part on an initial observation setup associated with a portion of audiovisual content and a set of conditions associated with that initial observation setup, the audiovisual content can be rendered in a manner that takes into account the position of a user and creative choices made by a content creator when rendering content to a viewer. In this regard, the observation point and orientation selection for audiovisual content can be controlled by an apparatus 200 as depicted in FIG. 2. The apparatus may be embodied by any of the cameras 102, media sources 104, or any of the other devices discussed with respect to FIG. 1, such as video processor 106, and/or devices that may be incorporated or otherwise associated with network 110. Alternatively, the apparatus 20 may be embodied by another computing device, external to such devices. For example, the apparatus may be embodied by a personal computer, a computer workstation, a server or the like, or by any of various mobile computing devices, such as a mobile terminal, e.g., a smartphone, a tablet computer, a video game player, etc. Alternatively, the apparatus may be embodied by a virtual reality system, such as a head mounted display such as virtual reality headset 114.

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIG. 3 depicts a video presentation 300 in which an example implementation of an embodiment of the invention may be illustrated. As shown in FIG. 3, video presentation 300 is a VR video presentation that is formed as a concatenation of content originating from two different scenes 316 and 318. Pictures within one scene generally have similar content and are typically captured by the same camera in a continuous manner. Pictures of two different scenes are typically captured by two different cameras or by the same camera but in timewise discontinuous manner. As shown in FIG. 3, there is a scene cut 320 in the video presentation 300. As also shown in example video presentation 300, the video presentation 300 is divided into (Sub)Segments 302-314 for transmission; although embodiments equally apply to non-segmented files as well. In the example depicted in FIG. 3, it is further assumed that each (Sub)Segment 302-314 starts with a random access point (such as an SAP in DASH and ISOBMFF). For each SAP, an initial observation setup is indicated (such as by the file or transport encapsulator, for example) along with an indication of the intended player behavior in continuous playback and when random accessing the respective (Sub)Segment 302-314.

As shown in FIG. 3, the first four (Sub)Segments 302, 304, 306, and 308 are from the same scene or camera. For these (Sub)Segments 302-308, it may be indicated, for example, that the initial observation setup applies conditionally when random accessing and does not apply in continuous playback. Such an indication would have the following consequences:

(1) If no other (Sub)Segment was processed earlier and the processing starts from any of the four (Sub)Segments 302-308, its initial observation setup is used at the beginning of the rendering. In other words, no matter what the orientation of the head-mounted display is at the beginning of the playback, the initial observation is used; and (2) it may be further indicated that the four (Sub)Segments 302-308 are within a range where the observation setup is not reset. Such an indication typically suits, for example, content that is captured with a stationary camera. If a first (Sub)Segment among these four (Sub)Segments 302-308 was processed earlier and at least partly displayed, and a second (Sub) Segment was subsequently accessed randomly and displayed, the initial observation setup of the second (Sub) Segment is not obeyed but, rather the orientation of the head-mounted display relative to the initial observation setup of the first (Sub)Segment is used in rendering.

As shown in FIG. 3, the fifth (Sub)Segment 310 contains video content from a different scene or camera compared to the earlier (Sub)Segments 302-308. It may be indicated that the initial observation setup of the fifth (Sub)Segment 310 applies unconditionally in both continuous playback and in random accessing. In other words, the viewer would always be displayed content of the same observation orientation regardless of whether the fifth (Sub)Segment 310 were accessed in continuous playback (that is, after completely processing the fourth (Sub)Segment 308, for example) or after random accessing.

As shown in FIG. 3, the sixth and seventh (Sub)Segments 312 and 314 are from the same scene or camera as the fifth (Sub)Segment 310. For the sixth and seventh (Sub)Segments 312 and 314, it may be indicated, for example, that the initial observation setup applies unconditionally when random accessing and does not apply in continuous playback. Such an indication typically suits content where the camera is moving and hence the keeping of an observation orientation that is relative to the initial observation setup of an earlier (Sub)Segment might not be desirable in the content creator's opinion, since a region of interest could be missed after seeking, for example.

In some examples, global orientation offset(s) are included in the initial observation orientation information, and hence they need not be separately considered when selecting Adaptation Sets, Representations, or Sub-Representations to be requested. In some examples, global orientation offset(s) are separate from the initial observation orientation information, and hence they need to be jointly considered when selecting Adaptation Sets, Representations, or Sub-Representations to be requested.

Some example implementations also contemplate a reset range or a sustaining range or both of them. In some such example implementations, the content creator may want to control that the user, for example (1) always sees a particular region of interest, and (2) has a spatially and temporally continuous experience precisely following head movements. In some contexts, these two goals may contradict, such as when the user peeks at a completely opposite orientation than where the region of interest lies. To obtain both functionalities, the initial observation setup may be accompanied by a reset condition and/or a sustaining condition. A reset range may be defined as a set of viewports that cause, when the present viewing direction is within said set of viewports, a reset of the observation setup. A sustaining range may be defined as a set of viewports that cause, when the present viewing direction is within the set of said set of viewports, sustaining the present viewing direction rather than resetting the observation setup.

In one such example implementation, a sustaining range and/or a reset range is indicated or parsed with reference to an angular width and height. For example, a sustaining condition may include, for example, a horizontal and vertical field of view of a region of interest. When the rendered viewport covers the entire region of interest (as indicated by the initial observation orientation and the horizontal and vertical FOVs of the region of interest), the observation setup is not reset. Otherwise, the observation setup is reset without considering the previous orientation of the head-mounted display (such as the present observation setup, for example). In another example implementation, a sustaining range and/or a reset range is indicated or parsed with reference to a two-dimensional region (e.g. a rectangle) within a 2D image plane of a particular projection and a particular mapping.

Some example implementations contemplate and/or arise in the context of multiple observation points. In some such contexts, VR content may be produced with several cameras providing alternative observation points to the same content. For example, a concert may be captured with one or many stationary VR cameras on the stage, one or more VR cameras carried by cameramen on the stage, and/or one or more VR cameras attached on a crane that may be moving. An initial observation setup may include the selection of the initial observation point used for rendering. The user may be offered the possibility to switch from one observation point to another when viewing the content. In some cases, the observation points may be close to each other, e.g. when a camera rig has been used. In an embodiment, a sustaining range or a reset range of observation points is indicated or parsed. For example, it may be indicated that the initial observation setup is not be applied when switching between certain adjacent observation points (i.e., a sustaining range of observation points is indicated). In implementations that involve DASH, observation points may be identified for example through the Viewpoint property descriptor that is already defined in the DASH specification. A particular value of @schemeIdUri may be defined to for VR observation point indication to be used together with the Viewpoint property descriptor or any other property descriptor. @value may be used to carry an identifier of the observation point.

Some example implementations also contemplate a playback mode condition. A playback mode condition may be pre-defined e.g. in a standard or may be indicated e.g. by a video processor 106 in a video stream or a description of a video stream. A playback mode condition may indicate the playback modes for which the initial observation setup applies and/or the playback modes for which the initial observation setup does not apply. Playback modes may comprise but are not limited to continuous playback, seek or random access for initiating continuous playback, fast forward play in which e.g. only intra-coded pictures are played, fast backward play in which e.g. only intra-coded pictures are played. A playback mode condition may enable the content author to indicate that the observation setup is reset when seeking for initiating continuous playback but is not reset for fast forward or backward play, or vice versa.

Some example implementations also contemplate additional signaling options. In one such example implementation, the approach to providing timed audiovisual content intended for user-driven selective rendering may be characterized by: indicating an initial observation setup within a syntax structure; and indicating, in the syntax structure, if the initial observation setup applies unconditionally when random accessing In another example implementation, the approach to accessing audiovisual content intended for user-driven selective rendering may be characterized by: parsing an initial observation setup from a syntax structure; and parsing, from the syntax structure, if the initial observation setup applies unconditionally when random accessing. In another example implementation, the syntax structure may be included in or parsed from a presentation layer, such as SMIL or HTML5 or presentation information included therein (e.g. cascaded style sheets). In an embodiment, the syntax structure is an element in a markup language, such as HTML5. In another example implementation, the syntax structure may be included in or parsed from a presentation description or a streaming manifest, such as DASH MPD or SDP (Session Description Protocol).

In another example implementation involving DASH, the syntax structure may be an Event. The Event and the EventStream element containing the Event may be used for example as follows:

An observation setup identifier is Event@id.

Event@messageData comprises one or more of the following: an indication if the initial observation setup does not apply, applies unconditionally, or applies conditionally in continuous playback; an indication if the initial observation setup does not apply, applies unconditionally, or applies conditionally when random accessing; an indication of the initial observation point; and/or an indication of the initial observation orientation A specific URI in EventStream@schemeIdUri identifies that the contained Events provide information on initial observation setups.

In such an example implementation, an EventStream@value may identify the observation point that the contained Events concern. In another example implementation, an EventStream@value may identify the Adaptation Sets, Representations, or Sub-Representations that the contained Events concern.

In another example implementation, the syntax structure is included in or parsed from a container file, a Segment, or a Subsegment. When the container file, Segment or Subsegment conforms to ISOBMFF, the following embodiments are possible: the syntax structure may be an inband Event; the syntax structure may be a sample of a timed metadata track of ISOBMFF; the syntax structure may be a sample group description entry of ISOBMFF; and/or the syntax structure may be a box within a sample entry.

In another example implementation, the syntax structure may be included inband in a media bitstream. For example, the syntax structure may be an SEI message in a video bitstream, or a unit of ancillary data within an audio bitstream. Many video coding standards, such as H.264/AVC and H.265/HEVC, enable including supplemental enhancement information (SEI) in the video bitstream. SEI may be encapsulated in a particular data structure, such as SEI network abstraction layer (NAL) unit in H.264/AVC and H.265/HEVC. The data structure may comprise one or more SEI messages. SEI messages are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

Some example implementations contemplate and/or arise in the context of a DASH client operation. In one such example implementation, it is assumed that the signaling is done with the approach of an Event Stream as described above, but the description similarly applies to other signaling options. First, the DASH client parses from the MPD that an Event Stream for initial observation setups is available. If no such Event Stream is available, the DASH client won't be able to perform the processing below.

The DASH client may then parse an Event that matches to or covers the first (Sub)Segment from which the playback is to be started. The Event contains an indication of the initial observation point (when the MPD announces content for several observation points) and the initial observation orientation. If an initial observation point is included in the Event, the client selects which Adaptation Sets match with that initial observation point—for example, by examining which Adaptation Sets contain a Viewpoint property descriptor with @schemeIdUri indicating observation points and @value being equal to the initial observation point identifier included in the Event. If an initial observation orientation is included in the event, the DASH client selects which Adaptation Sets, Representations or Sub-Representations include that orientation for example by examining if viewport(s) indicated in a VR property descriptor (such as described in MPEG M38613, which is incorporated herein by reference) cover the initial observation orientation. The applicable global orientation offset(s) and the orientation of the projection structure or the projected frame may be taken into account as described earlier, when determining which Adaptation Sets, Representations or Sub-Representations match with that initial observation orientation. If there are several Adaptation Sets covering the initial observation orientation, the DASH client may select for example the Adaptation Set that includes the initial observation orientation at the best quality (e.g. indicated with a quality_ranking value of the VR property descriptor) and/or where the initial observation orientation is the center-most within the viewports covered by the Adaptation Sets. If there are several Representations or Sub-Representations within an Adaptation Set covering the initial observation orientation, the DASH client may select for example the Representation or Sub-Representation where there is a viewport covering the initial observation orientation at the best quality (e.g. indicated with a quality_ranking value of the VR property descriptor). After selecting the Adaptation Set, and Representation or Sub-Representation from that Adaptation Set, the client may request the first (Sub)Segment from that Representation or Sub-Representation.

During continuous playback, the DASH client may parse the Events in the Event Stream for initial observation setups. When the presentation time of an Event that applies to continuous playback is met, the client resolves whether the Event is applied. An Event that applies unconditionally resets the present observation setup to be equal to the initial observation setup (contained in the Event). For an Event that applies conditionally, the conditions are processed and if they are fulfilled, the client resets the present observation setup to be equal to the initial observation setup (contained in the Event). After such reset, subsequent (Sub)Segment requests are made accordingly and the client also uses the initial observation setup in rendering of the content. Otherwise (when no reset of the present observation point takes place), the client continues to use the present observation point.

The DASH client may offer seeking or random access feature to the user. After seeking the client may operate similarly to what is described above but additionally consider handling of an initial observation setup that applies conditionally when random accessing. The DASH client may process the indications conditions for applying the initial observation setup. For that purpose the DASH client may obtain a current viewing orientation e.g. from the head-mounted display. If the conditions are fulfilled or if the initial observation point applies unconditionally when random accessing, the client resets the present observation setup to be equal to the initial observation setup and request the (Sub)Segment accordingly. The client also uses the initial observation setup in rendering of the content. If the conditions are not fulfilled, the client continues to use the present observation setup. By parsing the projection and mapping metadata from the MPD (e.g. from one or more descriptors described above), the DASH client concludes which Adaptation Set and Representation cover the current viewing orientation at the highest quality and at a bitrate that can be afforded by the prevailing estimated network throughput. The DASH client issues (Sub)Segment requests accordingly.

In an example implementation, the client receives and parses indications associated with an initial observation setup in advance of the media data they apply to. For example, a DASH client can receive and parse an Event Stream in advance of the time that the requests for the respective (Sub)Segments are issued. The client parses at least which initial observation setup indications apply unconditionally in continuous playback. The client concludes which (Sub)Segment requests are likely to be made subsequently based on the initial observation setup indications that apply unconditionally in continuous playback. The client may also consider the prevailing estimated network throughput and other aspects, such as the field of view of the display, when determining the likely (Sub)Segment requests.

In an example implementation, the likely subsequent (Sub)Segment requests are indicated as URLs and, in some cases, byte range(s). An HTTP GET request for the URL and the associated byte range(s) resolves in a likely subsequent (Sub)Segment request.

In an example implementation, said informing is performed through DASH SAND messages. In an embodiment, the AnticipatedRequests SAND message is used to convey said URLs and, in some cases, byte range(s).

In an embodiment, said informing is performed using an HTTP header, which can be included for example as a part of a GET request. In an embodiment, the HTTP header complies with the specifications of DASH SAND.

As described earlier, in some example implementations, video processor 106 embeds information indicative of saliency points into the video stream or a separate stream (or a signaling structure, such as Media Presentation Description) associated with the video stream.

In an example implementation, information indicative of saliency points is interpreted in the initialization of streaming and when random accessing as the initial observation setup in various embodiments.

In an embodiment, saliency point information is indicative of (Sub)Segments that are likely to be requested, rather than exact saliency points within the decoded content that may be understood to be time-wise and spatially accurate.

A method according to an example implementation may include:

receiving information indicative of (Sub)Segments comprising saliency points;

causing a signal to be generated, the signal indicating requests of the (Sub)Segments;

transmitting the signal.

In an example implementation, saliency point information is generated as a function of time on (Sub)Segment granularity. In other words, saliency point information is indicative of a likely (Sub)Segment, for each non-overlapping (sub)segment duration, to be requested by clients. In an embodiment, (Sub)Segment-granularity saliency point information is indicated as a sequence of URLs, each indicating a (Sub)Segment likely to be requested by clients. In an embodiment, (Sub)Segment-granularity saliency point information is indicated with reference to a URL template and a list and/or a range of attribute values to be inserted into the URL template in order to obtain URLs of (Sub)Segments likely to be requested by clients. In an embodiment, (Sub)Segment-granularity saliency point information is indicated with reference to an MPD or alike and a list or a range of identifier values for a pre-defined or indicated identifier hierarchy, according to or similarly to the hierarchical data model (e.g. in DASH). For example, a list of Period identifiers may be indicated, for each Period, a list of Adaptation Set identifiers may indicated, for each Adaptation Set, a list of Representation identifiers and their validity period in terms of presentation times (e.g. in segment timeline) or segment numbering may be indicated.

In an example implementation, (Sub)Segment-granularity saliency point information is indicated by indicating a likely viewing direction or orientation, e.g. in terms of yaw, pitch, and roll. In an embodiment, the likely viewing direction or orientation includes the global orientation offset(s). Consequently, a client does not need to fetch global orientation offset(s) prior to concluding which Adaptation Sets, Representations, or Sub-Representations cover the likely viewing direction or orientation. In an example implementation, the likely viewing direction or orientation does not include the global orientation offset(s). Consequently, a client fetches global orientation offset(s) prior to concluding which Adaptation Sets, Representations, or Sub-Representations cover the likely viewing direction or orientation, and essentially considers the sum of the global orientation offset(s) and the likely viewing direction or orientation when concluding which Adaptation Sets, Representations, or Sub-Representations cover the likely viewing direction or orientation. The indication of the likely viewing direction or orientation can be understood to have the semantics that the Adaptation Sets, Representations, or Sub-Representations which cover the likely viewing direction or orientation and have a quality ranking indicating a relatively high quality for the likely viewing direction or orientation are likely to be requested by clients. The covered viewing directions or orientations and their quality ranking may be indicated for example by the Virtual Reality Video Descriptor and/or the Spatial Relationship Descriptor, as described earlier.

In an example implementation, saliency point information is indicated in the video stream using events, e.g. DASHEventMessageBoxes, that are allowed to appear at the start of (Sub)Segment, before any 'moof' box of that (Sub)Segment.

In an example implementation, saliency point information is indicated in as an Event Stream or alike in the Media Presentation Description or alike. In some embodiments, the presentation time (@presentationTime) and the duration (@duration) of events are selected to match (Sub)Segment boundaries. The message data (@messageData) may comprise a structure indicative of the (Sub)Segments likely to be requested by clients, for which different options are described above.

In an example implementation, a client receives saliency point information e.g. through one of the means explained above, such as through an EventStream element in DASH MPD. The client concludes which (Sub)Segment requests are likely to be made subsequently based on the saliency point information as described above. The client informs a network element, such as a proxy cache, on the likely subsequent (Sub)Segment requests.

In an example implementation, the client receives (Sub) Segment-granularity saliency point information.

In an example implementation, the likely subsequent (Sub)Segment requests are indicated as URLs and, in some cases, byte range(s). An HTTP GET request for the URL and the associated byte range(s) resolves in a likely subsequent (Sub)Segment request.

In an example implementation, said informing is performed through DASH SAND messages. In an embodiment, the AnticipatedRequests SAND message is used to convey said URLs and, in some cases, byte range(s).

In an example implementation, said informing is performed using an HTTP header, which can be included for example as a part of a GET request. In an embodiment, the HTTP header complies with the specifications of DASH SAND.

In an example implementation, a network element, such as a proxy cache or an edge server, receives saliency point information e.g. through one of the means explained above. The network element concludes which (Sub)Segment requests are likely to be made subsequently based on the saliency point information as described above. The network element pre-fetches the (Sub)Segments. Consequently, when a client issues requests for these (Sub)Segments, they are readily available in the network element and the requests can therefore be responded faster.

In an example implementation, a network element, such as a proxy cache or an edge server, receives information on likely subsequent (Sub)Segment requests, e.g. from a client. The network element pre-fetches the (Sub)Segments. Consequently, when a client issues requests for these (Sub) Segments, they are readily available in the network element and the requests can therefore be responded faster.

In an example implementation, global orientation offset information is generated as a function of time on (Sub) Segment granularity. As the global orientation offset may evolve within a (Sub)Segment, the (Sub)Segment-granular global orientation offset information may indicate a range of global orientation offsets that covers the variation of the global orientation offsets within the (Sub)Segment. In an embodiment, the (Sub)Segment-granular global orientation offset information is included in DASH events as an Event Stream in-band or in the MPD.

FIG. 4 provides another depiction of how the solutions described herein may be used to address the technical issues associated with reorienting audiovisual content in a virtual reality environment. As shown in FIG. 4, audiovisual content 400 comprises eight views, 402-416 that can be used to represent a 360-degree field, and have been captured, such as by a Nokia OZO camera system or other multi-camera system. In the example implementation shown in FIG. 4, the MPVD is known at any time for the content included in views 402-416, and is shown at points 418, 420, 422, 424, and 426. In order to reduce the likelihood that a viewer is oriented and/or positioned in a manner that causes the user to be misaligned with the MPVD (or in a manner such that physical movement to become aligned with the MPVD is difficult and/or uncomfortable), views 402-416 may be rendered to the viewer such that the view(s) having the MPVD most centrally located with respect to a particular camera view are presented in front of the viewer. For example, as shown in FIG. 4, MPVD points 424 and 426 are relatively close to the center of their respective views, 410 and 412. As shown by loop 428, views 410 and 412 are selected and rendered such that they are presented in front of the viewer, which results in the viewer being presented the MPVD, even if the position or orientation of the viewer would ordinarily cause another view or views to be presented in front of the viewer. The remaining views 402, 404, 406, 408, 414, and 416, can also be rendered in a manner that takes into account the shift associated with moving views 410 and 410 to be in front of the viewer.

FIG. 5 presents another depiction of how the solutions described herein may be used to address the technical issues associated with reorienting audiovisual content in a virtual reality environment. The audiovisual content 400 from FIG. 4 is shown in FIG. 5, including each of views 402-416 and MPVD points 418-426. In contrast to FIG. 4, wherein the distance from an MPVD point to the center of its respective view was used to ascertain which view(s) to present in front of a viewer, FIG. 5 depicts an implementations that contemplates scalable coding of views. Layers of a view may cover a different viewport within the view. FIG. 5 depicts a case where the viewport of layers of a view has the same orientation but an increasing coverage of the field of view. However, other layered coding arrangements are also possible, including but not limited to arrangements with layers partially overlapping and differing orientations but identical field of view within a view, for example. In FIG. 5 layers define regions of proximity to the center of the view. As shown in FIG. 5, layers 402' and 402" are marked in view 402, and it will be appreciated that corresponding layers are shown in each of the other views 404-416. In the example implementation shown in FIG. 5, it is unnecessary to calculate the absolute distance from the center of a particular view to an MPVD point. Rather, views can be sorted and selected based on the particular layer in which an MPVD point may be found. As shown in FIG. 5, MPVD points 424 and 426 are both located within the innermost layer shown in views 410 and 412, while the other MPVD points are shown as being at least partially in outer layers of their respective views. Consequently, as noted by loop 428, views 410 and 412 may be selected and rendered such that they are presented directly in front of the viewer.

The example implementations shown in FIGS. 4 and 5 may be particularly advantageous in the context of stereoscopic views and situations where the content present in the MPVD should be rendered in a manner that allows it to be presented in front of the user as often as possible, regardless of the positioning and/or orientation of the viewer (or the viewing device used by the user). While the examples discussed herein with respect to FIGS. 4 and 5 contemplate the selection of any of the potential views present in a particular stream, it will be appreciated that additional constraints may be imposed on the selection of the views to be presented to a viewer. For example, the selection of the views may depend at least in part on the direction of a head-mounted display at the starting time of the content, such that if the head mounted display is pointed upwards, the pool of potential views to be selected may be limited to upper (in the sense of a vertical axis) views. Likewise, if the display is generally directed in the middle of the available views (in the sense of a vertical axis), the pool of potential views to be selected may be limited to those that are present along a similar vertical position.

Referring now to FIG. 6A, the operations performed by the apparatus 200 of FIG. 2 in accordance with an example embodiment of the present invention are depicted as an example process flow 600. In this regard, the apparatus includes means, such as the processor 202, the memory 204, the communication interface 208 or the like, for receiving an indication associated with an initial observation setup of a set of transmission units of an audiovisual presentation; receiving an indication associated with an intended behavior of a playback device; determining the intended behavior of the playback device; and in response to determining the intended behavior of the playback device, causing a control signal to be generated, wherein the control signal is associated with a rendering operation of the audiovisual presentation on the playback device. As such, the apparatus is generally capable of effecting the controlled observation and orientation selection for audiovisual content discussed and otherwise contemplated herein.

The apparatus includes means, such as the processor 202, the memory 204, the communication interface 208 or the like, for receiving an indication associated with an initial observation setup of a set of transmission units of an audiovisual presentation. With reference to FIG. 6A, process flow 600 commences at block 602 with receiving an indication associated with an initial observation setup. In some example implementations of process flow 600, the observation setup may include an observation point and an observation orientation. In example implementations that arise in DASH environments, the initial observation setup may be indicated in a stream access point (SAP) for each segment and/or subsegment of the audiovisual content to be presented to a viewer.

The apparatus also includes means, such as the processor 202, the memory 204, the communication interface 208 or the like, for receiving an indication associated with an intended behavior of a playback device. With reference to FIG. 6A, process flow 600 continues at block 604 with receiving an indication associated with the intended behavior of a playback device. In general, for many example implementations, the indication associated with intended behavior of a playback device allows for a determination of the "strength" of a content creator's preference that certain content be rendered in a particular manner, and contemplates conditions under which a viewer's positioning (such as the position of the user's head, or other orientation of a viewing device, for example) may override the content creator's preferences. In some example implementations of block 604, the intended behavior of the playback device includes, upon the satisfaction of a condition, setting the observation setup to the initial observation setup. In some example implementations of block 604, the indication associated with the intended behavior of the playback device comprises an indication associated with an intended behavior of the playback device under a continuous playback mode of the playback device and an indication associated with an intended behavior of the playback device under a random access mode of the playback device. As such, some example implementations of block 604 contemplate a degree of situational behavior of the playback device, in the sense that content may be rendered in one manner when in a continuous playing mode, while content may be rendered in another manner when a segment or subsegment of content is randomly accessed.

The apparatus includes means, such as the processor 202, the memory 204, the communication interface 208 or the like, for determining the intended behavior of the playback device. With reference to FIG. 6A, process flow 600 continues at block 606 with determining the intended behavior of the playback device. In some example implementations of block 606, determining the intended behavior of the playback device comprises determining whether a condition associated with the intended behavior of the playback device has been met. Some example implementations contemplate scenarios involving an indication that an initial observation setup (1) does not apply, (2) applies conditionally, or (3) applies unconditionally in continuous playback. Likewise, some such example implementations and other example implementations contemplate scenarios involving an indication that an initial observation setup (1) does not apply, (2) applies conditionally, or (3) applies unconditionally when random accessing of the segment or subsegment occurs.

In some example implementations, the condition comprises at least one reset condition associated with the initial observation setup. For example, a reset condition may be met that causes the initial observation setup to apply. In such example implementations, the reset condition may take the form of a reset range of observation points and/or observation orientations that cause the initial observation setup to apply. Moreover, in some implementations, the reset condition may be based at least in part on a present observation setup.

In some such example implementations, and in other example implementations, the condition comprises at least one sustaining condition associated with the initial observation set up, such as, for example, a sustaining condition that causes the initial observation setup to not apply. In such example implementations, the sustaining condition may include a sustaining range indicative of observation points and/or observation orientations that cause the initial observation setup to not apply.

The apparatus includes means, such as the processor 202, the memory 204, the communication interface 208 or the like, for in response to determining the intended behavior of the playback device, causing a control signal to be generated, wherein the control signal is associated with a rendering operation of the audiovisual presentation on the playback device. With reference to FIG. 6A, process flow 600 continues to block 608, which includes, in response to determining the intended behavior of the playback device, causing a control signal associated with a rendering operation to be generated. In some example implementations of block 608, the control signal is indicative of the intended behavior of the playback device. In some example implementations of block 608, the rendering operation of the audiovisual presentation on the playback device comprises selecting a portion of the audiovisual presentation. As discussed throughout herein, and with reference to FIGS. 3, 4, and 5, implementations of process 600 and other embodiments of the invention contemplate whether, and to what degree, the content presented to a viewer should be rendered such that the relative positioning of the content with respect to the viewer is realigned and/or shifted based on the initial observation setup associated with a segment or subsegment of content, the orientation of the viewing device, and/or the manner in which the segment or subsegment is encountered (continuous playback or random accessing, for example). In some example implementations of block 608, upon determining the intended behavior of the playback device (based, for example, on a determination of that a condition associated with the application of the initial observation setup has been met), a control signal may be generated that directly or indirectly causes content to be rendered in the intended manner and presented to the viewer.

It will be appreciated that some implementations of process 600, and other embodiments of the invention described herein, contemplate the repeated determining of the intended behavior of the playback device. For example, some example implementations contemplate a first observation setup identifier associated with a first set of transmission units of audiovisual content, and a second observation setup identifier for a second set of transmission units. In some such example implementations, a transmission unit may be defined by one or more Adaptation Set, Representation, Subrepresentation, set of segments, set of subsegments, and/or a time range. These different transmission units may be associated with different reset conditions and/or sustaining conditions, such that the intended behaviors for the separate transmission units differ. Moreover, the conditions associated with the separate transmission units may be correlated or otherwise linked, such that the conditions and/or intended behavior associated with one transmission unit are based at least in part on the conditions and/or intended behavior associated with the other transmission unit.

Referring now to FIG. 6B, another set of operations performed by the apparatus 200 of FIG. 2 in accordance with an example embodiment of the present invention are depicted as an example process flow 1000. It will be appreciated that some example implementations of process flow 1000 may be particularly advantageous in embodiments that arise within and/or are performed by a viewing device, such as virtual reality headset 114 for example. In this regard, the apparatus includes means, such as the processor 202, the memory 204, the communication interface 208 or the like, for detecting an observation setup associated with a set of transmission units of an audiovisual presentation. With reference to FIG. 6B, process flow 1000 commences at block 1002 with detecting an observation setup associated with transmission units of an audiovisual presentation. Detecting the observation setup may be done in accordance with any of a number of approaches, depending on how the observation setup is received, which may in turn be dependent upon the protocols and formats associated with the audiovisual presentation and the transmission thereof. It will be appreciated that any of media formats and protocols discussed and/or contemplated herein may be used in implementations of process 1000 and block 1002. In some example embodiments, the observation setup comprises one or both of an observation point and an observation orientation. In some example implementations, the observation setup may include an indication of a most probable viewing direction. Implementations that account for an MPVD may be particularly advantageous where the MPVD has been determined, either through identification by a content creator and/or through the gathering and processing of usage data associated with multiple viewings and/or viewers of the content.

The apparatus also includes means, such as the processor 202, the memory 204, the communication interface 208 or the like, for determining whether a condition associated with the observation setup is met. With reference to FIG. 6B, process flow 1000 continues at block 1004 with determining whether a condition associated with the observation setup is met. As discussed herein, many example implementations of embodiments of the invention contemplate controlling the observation point and orientation selection associated with audiovisual content based on aspects of the content (such as an orientation setup, MPVD, and/or other information about the content) and/or other factors, such as the positioning of a viewer and/or viewing device, the context in which the user encounters a particular segment or subsegment of content, and/or other factors, and responsively displaying content to the viewer in a particular manner. In some example implementations of block 1004, determining whether a condition associated with the observation setup is met comprises determining an orientation associated with the playback device. For example, a playback device, such as virtual reality headset 114, for example, may be configured to detect and provide information associated with the absolute and/or relative positioning (including but not limited to the roll, pitch, and yaw and/or viewing angle) of the playback device, the user, or both. In some example implementations, determining whether a condition associated with the playback device is met comprises determining whether the playback device is in a continuous playback mode and/or whether the playback device is in a random access mode. As discussed herein, whether or not a particular observation setup is applied in a given situation may be sensitive to whether the user has randomly accessed a particular portion of an audiovisual presentation, or has encountered that same portion by viewing previous portions continuously, in order to provide the desired viewing experience to the viewer.

The apparatus also includes means, such as the processor 202, the memory 204, the communication interface 208 or the like, for, in response to determining whether a condition associated with the observation is met, selecting a subset of the transmission units of an audiovisual presentations. With reference to FIG. 6B, process flow 1000 continues at block 1006 with selecting a subset of the transmission units. With reference to FIGS. 3, 4, and 5 and the discussions related thereto, upon receiving an observation setup and determining whether any condition or conditions associated with the observation setup are met, one or more portions or views associated with the audiovisual presentation can be selected for display to the user. Any of the approaches to identifying and/or selecting the views to be presented discussed and/or contemplated herein may be used in example implementations of block 1006.

The apparatus also includes means, such as the processor 202, the memory 204, the communication interface 208 or the like, for, causing a control signal to be generated, wherein the control signal is associated with a rendering operation of the selected subset of the transmission units of the audiovisual presentation on the playback device. With reference to FIG. 6B, process flow 1000 continues at block 1008 with causing a control signal associated with rendering the selected subset of the transmission units to be generated. In some example implementations of block 1008, the control signal includes an indication of an intended behavior of a playback device. For example, upon determining whether any conditions associated with the observation setup are met and selecting one or more views to be displayed, the apparatus may generate a control signal that instructs and/or otherwise causes a viewing device, such as virtual reality headset 114, for example, to render the selected content in a particular, intended manner. For example, in situations where the received observation setup is to be applied, the control signal may be generated in a manner that can be recognized and processed by the rendering process and/or the viewing device to render the content in accordance with that observation setup. Similarly, in situations where the received observation setup is not to be applied, a control signal may be generated to confirm to the rendering process and/or the viewing device that the views rendered to the viewer should not be impacted by the received observation setup.

As described above, FIG. 6A and FIG. 6B illustrate a flowcharts of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Some embodiments have been described herein with reference to 360° video. As used herein, the term 360° video should be understood to cover any projection format. Moreover, while in some implementations, a 360° field of view is contemplated, example implementations may be used in connection with other fields of view, including but not limited to fields of view with coverage other than 360°, and may generally be less than that, without departing from the scope of the embodiments described herein.

In the above, some embodiments have been described in relation to ISOBMFF and/or formats derived from ISOBMFF. However, many example embodiments similarly apply to other file and segment formats, including but not limited to the Matroska file format.

In the above, some embodiments have been described in relation to HTTP and/or HTTP GET requests. It needs to be understood that embodiments are not limited to the use of HTTP, but other protocols, such as Web Sockets, may be used instead or additionally. Likewise, different versions of HTTP may be used, such as HTTP/1.1 or HTTP/2. Likewise, HTTPS may be used. It also needs to be understood that the invention may be applied in cases where no requests, such as HTTP GET, are made by a client, e.g. when a client receives data through a broadcast, such as a broadcast service according to 3GPP Multimedia Broadcast/Multicast Service (MBMS).

In the above, some embodiments have been described in relation to MPEG-DASH or DASH. However, example implementations and embodiments similarly apply to other forms of streaming over HTTP, such as the Apple HTTP Live Streaming (HLS), for example. It should be understood that DASH-specific terminology in embodiments can be adjusted to similar terms in other streaming formats and systems.

In the above, some embodiments have been described in relation to Media Presentation Description (MPD) of MPEG-DASH. However, example implementations and embodiments similarly apply to other streaming manifest formats, such as the HLS M3U format, or other stream or presentation description formats, such as SDP (Session Description Protocol), for example.

In the above, some embodiments have been described in relation to the term (Sub)Segment. The parenthesis in that phrasing is meant to indicate that the embodiments equally apply to the term Subsegment and the term Segment. Moreover, implementations may be similarly applied to units similar to Segments or Subsegments. For example, embodiments can be applied to self-contained movie fragments.

In the above, some embodiments have been described in relation to Events and/or Event Streams of MPEG-DASH. It needs to be understood that embodiments similarly apply to entities similar to Events and entity streams similar to Event Streams. For example, rather than Event Streams embodiments may be realized with timed metadata tracks (that may be conveyed in Representations that are separate from audio/video Representations) rather than Event Streams, in which case Events correspond to samples of a timed metadata track in some embodiments.

In the above, some embodiments have been described by referring to the term streaming. However, example implementations and embodiments similarly apply to other forms of video transmission, such as progressive downloading, file delivery, and conversational video communications, such as video telephone, for example.

In the above, some embodiments have been described by referring to the term saliency point. However, terms with similar or the same semantics could be used instead, such as point of interest. Moreover, rather than a single point (which could be interpreted as a single pixel, for example), implementations can be similarly realized by referring to a saliency region or region of interest instead of a saliency point.

In the above, the phrases direction and orientation have sometimes been used interchangeably, while in some cases the term direction lacks a rotation "component" that is included in the term orientation includes the rotation "component". It needs to be understood that embodiments can be implemented with either interpretation and that either term could be used.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a timed metadata track associated with at least a portion of virtual reality video content or virtual reality image content projected onto one or more two-dimensional images, the timed metadata track having an International Organization for Standardization (ISO) base media file format, the timed metadata track comprising a sample having a syntax structure, the syntax structure of the sample comprising a first indication of an initial observation setup associated with the at least a portion of virtual reality video content or virtual reality image content, the initial observation setup comprising an observation orientation indicating an orientation of a viewport, the viewport being a subset of the virtual reality video content or the virtual reality image content, the syntax structure of the sample further comprising a second indication of an intended playback mode for a playback device;
   parsing, from the syntax structure of the sample, the first indication, the second indication, and one or more of the following:
      an indication whether, when the playback device is in a continuous playback mode, the initial observation setup applies unconditionally,
      an indication whether, when the playback device is in the continuous playback mode, the initial observation setup applies conditionally,
      an indication whether, when the playback device is in a random access mode, the initial observation setup applies unconditionally, or
      an indication whether, when the playback device is in the random access mode, the initial observation setup applies conditionally,
   wherein the random access mode refers to starting decoding of the virtual reality video content or the virtual reality image content at a point other than a beginning of the virtual reality video content or the virtual reality image content and recovering an exact or approximate reconstructed virtual reality signal;

when the playback device is in the continuous playback mode and the initial observation setup applies unconditionally, causing a control signal to be generated;

when the playback device is in the continuous playback mode and the initial observation setup applies conditionally, determining whether a condition associated with the initial observation setup has been met, and, when the condition has been met, causing the control signal to be generated;

when the playback device is in the random access mode and the initial observation setup applies either unconditionally or conditionally, causing the control signal to be generated; and in response to the control signal being generated, selecting and rendering the viewport of the virtual reality video content or the virtual reality image content according to the initial observation setup.

2. The method according to claim 1, wherein the initial observation setup additionally comprises an observation point, wherein the observation point is a point or volume in a three-dimensional space for acquisition or playback of the virtual reality video content or the virtual reality image content.

3. The method according to claim 1, wherein the playback device is in the continuous playback mode and the initial observation setup applies conditionally.

4. The method according to claim 3, wherein the condition comprises at least one reset condition associated with the initial observation setup.

5. The method according to claim 3, wherein the condition comprises at least one sustaining condition associated with the initial observation setup.

6. An apparatus comprising at least one processor and at least one memory storing computer program code, the at least one memory and the computer program code configured to, with the processor, cause the apparatus to at least:

receive a timed metadata track associated with at least a portion of virtual reality video content or virtual reality image content projected onto one or more two-dimensional images, the timed metadata track having an International Organization for Standardization (ISO) base media file format, the timed metadata track comprising a sample having a syntax structure, the syntax structure of the sample comprising a first indication of an initial observation setup associated with the at least a portion of virtual reality video content or virtual reality image content, the initial observation setup comprising an observation orientation indicating an orientation of a viewport, the viewport being a subset of the virtual reality video content or the virtual reality image content, the syntax structure of the sample further comprising a second indication of an intended playback mode for a playback device;

parse, from the syntax structure of the sample, the first indication, the second indication, and one or more of the following:

an indication whether, when the playback device is in a continuous playback mode, the initial observation setup applies unconditionally, an indication whether, when the playback device is in the continuous playback mode, the initial observation setup applies conditionally, an indication whether, when the playback device is in a random access mode, the initial observation setup applies unconditionally, or an indication whether, when the playback device is in the random access mode, the initial observation setup applies conditionally, wherein the random access mode refers to starting decoding of the virtual reality video content or the virtual reality image content at a point other than a beginning of the virtual reality video content or the virtual reality image content and recovering an exact or approximate reconstructed virtual reality signal;

when the playback device is in the continuous playback mode and the initial observation setup applies unconditionally, cause a control signal to be generated;

when the playback device is in the continuous playback mode and the initial observation setup applies conditionally, determine whether a condition associated with the initial observation setup has been met, and, when the condition has been met, cause the control signal to be generated;

when the playback device is in the random access mode and the initial observation setup applies either unconditionally or conditionally, cause the control signal to be generated; and in response to the control signal being generated, select and render the viewport of the virtual reality video content or the virtual reality image content according to the initial observation setup.

7. The apparatus according to claim 6, wherein the initial observation setup additionally comprises an observation point, wherein the observation point is a point or volume in a three-dimensional space for acquisition or playback of the virtual reality video or image content.

8. The apparatus according to claim 6, wherein the playback device is in the continuous playback mode and the initial observation setup applies conditionally.

9. The apparatus according to claim 8, wherein the condition comprises at least one reset condition associated with the initial observation setup.

10. The apparatus according to claim 8, wherein the condition comprises at least one sustaining condition associated with the initial observation set up.

11. A computer program product comprising at least one non-transitory computer-readable storage medium having computer-executable program code instruction stored therein, the computer-executable program code instructions comprising program code instructions configured to:

receive a timed metadata track associated with at least a portion of virtual reality video content or virtual reality image content projected onto one or more two-dimensional images, the timed metadata track having an International Organization for Standardization (ISO) base media file format, the timed metadata track comprising a sample having a syntax structure, the syntax structure of the sample comprising a first indication of an initial observation setup associated with the at least a portion of virtual reality video content or virtual reality image content, the initial observation setup comprising an observation orientation indicating an orientation of a viewport, the viewport being a subset of the virtual reality video content or the virtual reality image content, the syntax structure of the sample further comprising a second indication of an intended playback mode for a playback device;

parse, from the syntax structure of the sample, the first indication, the second indication, and one or more of the following:
- an indication whether, when the playback device is in a continuous playback mode, the initial observation setup applies unconditionally,
- an indication whether, when the playback device is in the continuous playback mode, the initial observation setup applies conditionally,
- an indication whether, when the playback device is in a random access mode, the initial observation setup applies unconditionally, or
- an indication whether, when the playback device is in the random access mode, the initial observation setup applies conditionally,
- wherein the random access mode refers to starting decoding of the virtual reality video content or the virtual reality image content at a point other than a beginning of the virtual reality video content or the virtual reality image content and recovering an exact or approximate reconstructed virtual reality signal;

when the playback device is in the continuous playback mode and the initial observation setup applies unconditionally, cause a control signal to be generated;

when the playback device is in the continuous playback mode and the initial observation setup applies conditionally, determine whether a condition associated with the initial observation setup has been met, and, when the condition has been met, cause the control signal to be generated;

when the playback device is in the random access mode and the initial observation setup applies either unconditionally or conditionally, cause the control signal to be generated; and in response to the control signal being generated, select and render the viewport of the virtual reality video content or the virtual reality image content according to the initial observation setup.

12. The computer program product according to claim 11, wherein the initial observation setup additionally comprises an observation point, wherein the observation point is a point or volume in a three-dimensional space for acquisition or playback of the virtual reality video or image content.

13. The computer program product according to claim 11, wherein the playback device is in continuous playback mode and the initial observation setup applies conditionally.

14. The computer program product according to claim 13, wherein the condition comprises at least one reset condition associated with the initial observation setup.

15. The computer program product according to claim 13, wherein the condition comprises at least one sustaining condition associated with the initial observation set up.

16. A method comprising:
receiving a sample of a timed metadata track of an International Organization for Standardization (ISO) base media file format file, the sample having a syntax structure, the syntax structure of the sample comprising a first indication of an initial observation setup associated with at least a portion of virtual reality video content or virtual reality image content projected onto one or more two-dimensional images, the initial observation setup comprising an observation point and an observation orientation, the observation orientation indicating an orientation of a viewport, the viewport being a subset of the virtual reality video content or the virtual reality image content, the syntax structure of the sample further comprising a second indication, wherein the second indication indicates an intended playback mode of a playback device configured to render at least the viewport of the virtual reality video content or the virtual reality image content, the syntax structure of the sample further comprising a third indication of one or more of:
- whether the initial observation setup is to be applied conditionally when the playback device is in the continuous playback mode,
- whether the initial observation setup is to be applied unconditionally when the playback device is in the continuous playback mode,
- whether the initial observation setup is to be applied conditionally when the playback device is in the random access mode, or
- whether the initial observation setup is to be applied unconditionally when the playback device is in the random access mode,
- wherein the random access mode refers to starting decoding of the virtual reality video content or the virtual reality image content at a point other than a beginning of the virtual reality video content or the virtual reality image content and recovering an exact or approximate reconstructed virtual reality signal;

when the playback device is in the continuous playback mode and the third indication indicates that the initial observation setup applies unconditionally in the continuous playback mode, causing a control signal to be generated;

when the playback device is in the continuous playback mode and the initial observation setup applies conditionally, determining whether a condition associated with the initial observation setup has been met, and, when the condition has been met, causing the control signal to be generated;

when the playback device is in the random access mode and the third indication indicates that the initial observation setup applies unconditionally or conditionally in the random access mode, causing the control signal to be generated; and in response to the control signal being generated, selecting and rendering the viewport of the virtual reality video content or the virtual reality image content according to the initial observation setup.

17. The method according to claim 16, wherein the playback device is in continuous playback mode and the initial observation setup applies conditionally.

18. The method according to claim 17, wherein the condition comprises at least one reset condition associated with the initial observation setup.

19. The method according to claim 17, wherein the condition comprises at least one sustaining condition associated with the initial observation set up.

* * * * *